(12) United States Patent
Hebron et al.

(10) Patent No.: US 11,362,786 B2
(45) Date of Patent: Jun. 14, 2022

(54) CHANNEL ACQUISITION USING ORTHOGONAL TIME FREQUENCY SPACE MODULATED PILOT SIGNALS

(71) Applicant: Cohere Technologies, Inc., Santa Clara, CA (US)

(72) Inventors: Yoav Hebron, Santa Clara, CA (US); Shlomo Selim Rakib, Santa Clara, CA (US); Ronny Hadani, Santa Clara, CA (US); Michail Tsatsanis, Santa Clara, CA (US); Clayton Ambrose, Santa Clara, CA (US); Jim Delfeld, Santa Clara, CA (US); Robert Fanfelle, Santa Clara, CA (US)

(73) Assignee: Cohere Technologies, Inc., Santa Clara, CA (US)

( * ) Notice: Subject to any disclaimer, the term of this patent is extended or adjusted under 35 U.S.C. 154(b) by 0 days.

(21) Appl. No.: 16/947,799

(22) Filed: Aug. 17, 2020

(65) Prior Publication Data
US 2021/0036823 A1    Feb. 4, 2021

Related U.S. Application Data

(63) Continuation of application No. 16/143,193, filed on Sep. 26, 2018, now Pat. No. 10,749,651, which is a
(Continued)

(51) Int. Cl.
*H04L 25/02*     (2006.01)
*H04L 5/00*      (2006.01)
(Continued)

(52) U.S. Cl.
CPC .......... *H04L 5/0048* (2013.01); *H04B 7/005* (2013.01); *H04B 17/309* (2015.01);
(Continued)

(58) Field of Classification Search
CPC ... H04L 5/0048; H04L 25/0226; H04L 27/01; H04L 5/0044; H04L 27/2639;
(Continued)

(56) References Cited

U.S. PATENT DOCUMENTS 4,754,493 A    6/1988    Coates
5,083,135 A    1/1992    Nagy et al.
(Continued)

FOREIGN PATENT DOCUMENTS

CN    1235720 A      11/1999
CN    101682316 A    3/2010
(Continued)

OTHER PUBLICATIONS

Office Action for U.S. Appl. No. 13/117,119, dated Aug. 5, 2013, 5 pages.
(Continued)

*Primary Examiner* — Jay P Patel
(74) *Attorney, Agent, or Firm* — Perkins Coie LLP

(57) ABSTRACT

Techniques for performing channel estimation in an orthogonal time, frequency and space (OTFS) communication system include receiving a wireless signal comprising a data signal portion and a pilot signal portion in which the pilot signal portion includes multiple pilot signals multiplexed together in the OTFS domain, performing two-dimensional channel estimation in a time-frequency domain based on a minimum mean square error (MMSE) optimization criterion, and recovering information bits using a channel estimate obtained from the two-dimensional channel estimation.

20 Claims, 27 Drawing Sheets

Related U.S. Application Data continuation of application No. PCT/US2017/025166, filed on Mar. 30, 2017.

(60) Provisional application No. 62/316,437, filed on Mar. 31, 2016.

(51) Int. Cl.
*H04L 27/01* (2006.01)
*H04L 27/26* (2006.01)
*H04B 7/005* (2006.01)
*H04B 17/309* (2015.01)
*H04B 17/373* (2015.01)

(52) U.S. Cl.
CPC ......... *H04B 17/373* (2015.01); *H04L 5/0007* (2013.01); *H04L 5/0044* (2013.01); *H04L 25/0202* (2013.01); *H04L 25/0204* (2013.01); *H04L 25/0226* (2013.01); *H04L 25/0232* (2013.01); *H04L 27/01* (2013.01); *H04L 27/2639* (2013.01); *H04L 27/2647* (2013.01)

(58) Field of Classification Search
CPC ............. H04L 25/0232; H04L 25/0204; H04L 27/2647; H04L 25/0202; H04L 5/0007; H04B 7/005; H04B 17/309; H04B 17/373

See application file for complete search history.

(56) References Cited

U.S. PATENT DOCUMENTS

| | | | |
|---|---|---|---|
| 5,182,642 A | 1/1993 | Gersdorff et al. | |
| 5,623,511 A | 4/1997 | Bar-David et al. | |
| 5,831,977 A | 11/1998 | Dent | |
| 5,872,542 A | 2/1999 | Simons et al. | |
| 5,956,624 A | 9/1999 | Hunsinger et al. | |
| 6,212,246 B1 | 4/2001 | Hendrickson | |
| 6,289,063 B1 | 9/2001 | Duxbury | |
| 6,356,555 B1 | 3/2002 | Rakib et al. | |
| 6,388,621 B1 | 5/2002 | Lynch | |
| 6,426,983 B1 | 7/2002 | Rakib et al. | |
| 6,608,864 B1 | 8/2003 | Strait | |
| 6,631,168 B2 | 10/2003 | Izumi | |
| 6,704,366 B1 | 3/2004 | Combes et al. | |
| 6,952,455 B1 | 10/2005 | Banister | |
| 6,956,814 B1 | 10/2005 | Campanella | |
| 7,010,048 B1 | 3/2006 | Shattil | |
| 7,327,812 B2 | 2/2008 | Auer | |
| 7,392,018 B1 | 6/2008 | Ebert et al. | |
| 7,689,049 B2 | 3/2010 | Monro | |
| 7,773,685 B2 | 8/2010 | Tirkkonen et al. | |
| 7,864,877 B2 | 1/2011 | Hottinen | |
| 8,229,017 B1 | 7/2012 | Lee et al. | |
| 8,259,845 B2 | 9/2012 | Dent | |
| 8,401,131 B2 | 3/2013 | Fety et al. | |
| 8,547,988 B2 | 10/2013 | Hadani et al. | |
| 8,619,892 B2 | 12/2013 | Vetter et al. | |
| 8,717,210 B2 | 5/2014 | Eldar et al. | |
| 8,879,378 B2 | 11/2014 | Rakib et al. | |
| 8,892,048 B1 | 11/2014 | Turner | |
| 8,976,851 B2 | 3/2015 | Hadani et al. | |
| 9,031,141 B2 | 5/2015 | Hadani et al. | |
| 9,071,285 B2 | 6/2015 | Hadani et al. | |
| 9,071,286 B2 | 6/2015 | Hadani et al. | |
| 9,083,483 B1 | 7/2015 | Rakib et al. | |
| 9,083,595 B2 | 7/2015 | Rakib et al. | |
| 9,130,638 B2 | 9/2015 | Hadani et al. | |
| 9,282,528 B2 | 3/2016 | Hashimoto | |
| 9,294,315 B2 | 3/2016 | Hadani et al. | |
| 9,444,514 B2 | 9/2016 | Hadani et al. | |
| 9,548,840 B2 | 1/2017 | Hadani et al. | |
| 9,553,984 B2 | 1/2017 | Krause et al. | |
| 9,590,779 B2 | 3/2017 | Hadani et al. | |
| 9,634,719 B2 | 4/2017 | Rakib et al. | |
| 9,660,851 B2 | 5/2017 | Hadani et al. | |
| 9,668,148 B2 | 5/2017 | Hadani et al. | |
| 9,712,354 B2 | 7/2017 | Hadani et al. | |
| 9,729,281 B2 | 8/2017 | Hadani et al. | |
| 10,693,692 B2 * | 6/2020 | Hadani ................ H04L 5/0048 |
| 2001/0031022 A1 | 10/2001 | Petrus et al. | |
| 2001/0033614 A1 | 10/2001 | Hudson | |
| 2001/0046205 A1 | 11/2001 | Easton et al. | |
| 2002/0001308 A1 | 1/2002 | Heuer | |
| 2002/0034191 A1 | 3/2002 | Shattil | |
| 2002/0097782 A1 | 7/2002 | Banister | |
| 2002/0181388 A1 | 12/2002 | Jain et al. | |
| 2002/0181390 A1 | 12/2002 | Mody et al. | |
| 2002/0181607 A1 | 12/2002 | Izumi | |
| 2003/0073464 A1 | 4/2003 | Giannakis et al. | |
| 2003/0185295 A1 | 10/2003 | Yousef | |
| 2003/0235147 A1 | 12/2003 | Walton et al. | |
| 2004/0044715 A1 | 3/2004 | Aldroubi et al. | |
| 2004/0174812 A1 | 9/2004 | Murakami et al. | |
| 2004/0189581 A1 | 9/2004 | Sako et al. | |
| 2004/0218523 A1 | 11/2004 | Varshney et al. | |
| 2005/0147025 A1 | 7/2005 | Auer | |
| 2005/0157778 A1 | 7/2005 | Trachewsky et al. | |
| 2005/0157820 A1 | 7/2005 | Wongwirawat et al. | |
| 2005/0180517 A1 | 8/2005 | Abe | |
| 2005/0207334 A1 | 9/2005 | Hadad | |
| 2005/0251844 A1 | 11/2005 | Martone et al. | |
| 2006/0008021 A1 | 1/2006 | Bonnet | |
| 2006/0039270 A1 | 2/2006 | Strohmer et al. | |
| 2007/0014272 A1 | 1/2007 | Palanki et al. | |
| 2007/0038691 A1 | 2/2007 | Candes et al. | |
| 2007/0078661 A1 | 4/2007 | Sriram et al. | |
| 2007/0104283 A1 | 5/2007 | Han et al. | |
| 2007/0110131 A1 | 5/2007 | Guess et al. | |
| 2007/0211952 A1 | 9/2007 | Faber et al. | |
| 2007/0237181 A1 | 10/2007 | Cho et al. | |
| 2007/0253465 A1 | 11/2007 | Muharemovic et al. | |
| 2007/0253504 A1 | 11/2007 | Hasegawa | |
| 2007/0263752 A1 | 11/2007 | Guey et al. | |
| 2008/0043857 A1 | 2/2008 | Dias et al. | |
| 2008/0117999 A1 | 5/2008 | Kadous et al. | |
| 2008/0186843 A1 | 8/2008 | Ma et al. | |
| 2008/0187062 A1 | 8/2008 | Pan et al. | |
| 2008/0232504 A1 | 9/2008 | Ma et al. | |
| 2008/0310383 A1 | 12/2008 | Kowalski | |
| 2009/0080403 A1 | 3/2009 | Hamdi | |
| 2009/0092259 A1 | 4/2009 | Jot et al. | |
| 2009/0103593 A1 | 4/2009 | Bergamo | |
| 2009/0122854 A1 | 5/2009 | Zhu et al. | |
| 2009/0161804 A1 | 6/2009 | Chrabieh et al. | |
| 2009/0204627 A1 | 8/2009 | Hadani | |
| 2009/0222226 A1 | 9/2009 | Baraniuk et al. | |
| 2009/0303961 A1 | 12/2009 | Popovic et al. | |
| 2010/0001901 A1 | 1/2010 | Baraniuk et al. | |
| 2010/0008432 A1 | 1/2010 | Kim et al. | |
| 2010/0027608 A1 | 2/2010 | Priotti | |
| 2010/0111138 A1 | 5/2010 | Hosur et al. | |
| 2010/0142476 A1 | 6/2010 | Jiang et al. | |
| 2010/0187914 A1 | 7/2010 | Rada et al. | |
| 2010/0238787 A1 | 9/2010 | Guey | |
| 2010/0277308 A1 | 11/2010 | Potkonjak | |
| 2010/0303136 A1 | 12/2010 | Ashikhmin et al. | |
| 2010/0322349 A1 | 12/2010 | Lee et al. | |
| 2011/0007789 A1 | 1/2011 | Garmany | |
| 2011/0110532 A1 | 5/2011 | Svendsen | |
| 2011/0116489 A1 | 5/2011 | Grandhi | |
| 2011/0116516 A1 | 5/2011 | Hwang et al. | |
| 2011/0126071 A1 | 5/2011 | Han et al. | |
| 2011/0131463 A1 | 6/2011 | Gunnam | |
| 2011/0216808 A1 | 9/2011 | Tong et al. | |
| 2011/0286502 A1 | 11/2011 | Adachi et al. | |
| 2011/0287778 A1 | 11/2011 | Levin et al. | |
| 2011/0292971 A1 | 12/2011 | Hadani et al. | |
| 2011/0293030 A1 | 12/2011 | Rakib et al. | |
| 2011/0299379 A1 | 12/2011 | Sesia et al. | |
| 2011/0305267 A1 | 12/2011 | Riu et al. | |
| 2012/0021769 A1 | 1/2012 | Lindoff et al. | |
| 2012/0051457 A1 | 3/2012 | Ma et al. | |
| 2012/0140716 A1 | 6/2012 | Baldemair et al. | |

(56) References Cited

U.S. PATENT DOCUMENTS

| | | |
|---|---|---|
| 2012/0170674 A1 | 7/2012 | Kim et al. |
| 2012/0170684 A1 | 7/2012 | Yim et al. |
| 2012/0201322 A1 | 8/2012 | Rakib et al. |
| 2012/0213098 A1 | 8/2012 | Sun |
| 2012/0235795 A1 | 9/2012 | Liao et al. |
| 2012/0269201 A1 | 10/2012 | Atungsiri et al. |
| 2012/0272117 A1 | 10/2012 | Stadelmeier et al. |
| 2012/0320994 A1 | 12/2012 | Loghin et al. |
| 2013/0021977 A1 | 1/2013 | Yang et al. |
| 2013/0058390 A1 | 3/2013 | Haas et al. |
| 2013/0077579 A1 | 3/2013 | Cho et al. |
| 2013/0083661 A1 | 4/2013 | Gupta et al. |
| 2013/0121497 A1 | 5/2013 | Smaragdis et al. |
| 2013/0230010 A1 | 9/2013 | Kim et al. |
| 2013/0260787 A1 | 10/2013 | Hashimoto |
| 2013/0279627 A1 | 10/2013 | Wu et al. |
| 2013/0315133 A1 | 11/2013 | Wang et al. |
| 2014/0143639 A1 | 5/2014 | Loghin et al. |
| 2014/0161154 A1 | 6/2014 | Hadani et al. |
| 2014/0169385 A1 | 6/2014 | Hadani et al. |
| 2014/0169406 A1 | 6/2014 | Hadani et al. |
| 2014/0169433 A1 | 6/2014 | Hadani et al. |
| 2014/0169436 A1 | 6/2014 | Hadani et al. |
| 2014/0169437 A1 | 6/2014 | Hadani et al. |
| 2014/0169441 A1 | 6/2014 | Hadani et al. |
| 2014/0247803 A1 | 9/2014 | Arambepola et al. |
| 2014/0348252 A1 | 11/2014 | Siohan et al. |
| 2014/0364128 A1 | 12/2014 | Lee et al. |
| 2015/0117395 A1 | 4/2015 | Hadani et al. |
| 2015/0326273 A1 | 11/2015 | Rakib et al. |
| 2015/0327085 A1 | 11/2015 | Hadani et al. |
| 2015/0382231 A1 | 12/2015 | Jabbar et al. |
| 2016/0043835 A1 | 2/2016 | Hadani et al. |
| 2016/0135132 A1 | 5/2016 | Donepudi et al. |
| 2016/0182269 A1 | 6/2016 | Hadani et al. |
| 2016/0191217 A1 | 6/2016 | Hadani et al. |
| 2016/0191280 A1 | 6/2016 | Hadani et al. |
| 2016/0254889 A1 | 9/2016 | Shattil |
| 2016/0277225 A1 | 9/2016 | Frenne et al. |
| 2016/0309345 A1 | 10/2016 | Tehrani et al. |
| 2016/0380743 A1 | 12/2016 | Rakib |
| 2016/0381576 A1 | 12/2016 | Hadani et al. |
| 2017/0012749 A1 | 1/2017 | Rakib et al. |
| 2017/0012810 A1 | 1/2017 | Rakib et al. |
| 2017/0019297 A1 | 1/2017 | Rakib |
| 2017/0033899 A1 | 2/2017 | Rakib et al. |
| 2017/0040711 A1 | 2/2017 | Rakib et al. |
| 2017/0078054 A1 | 3/2017 | Hadani et al. |
| 2017/0099122 A1 | 4/2017 | Hadani et al. |
| 2017/0099607 A1* | 4/2017 | Hadani ............... H04L 5/0016 |
| 2017/0149594 A1 | 5/2017 | Rakib et al. |
| 2017/0149595 A1* | 5/2017 | Rakib ............... H04L 27/264 |
| 2017/0201354 A1 | 7/2017 | Hadani et al. |
| 2017/0207817 A1 | 7/2017 | Hadani et al. |
| 2017/0222700 A1 | 8/2017 | Hadani et al. |
| 2017/0230215 A1 | 8/2017 | Rakib et al. |
| 2017/0244524 A1 | 8/2017 | Hadani et al. |
| 2018/0227159 A1* | 8/2018 | Rakib ............... H04L 27/2639 |
| 2018/0262306 A1* | 9/2018 | Hadani ............... H04L 27/2697 |
| 2019/0081836 A1* | 3/2019 | Hadani ............... H04L 5/0048 |

FOREIGN PATENT DOCUMENTS

| | | |
|---|---|---|
| CN | 101939935 A | 1/2011 |
| EP | 1432168 A1 | 6/2004 |
| JP | 2011127910 A | 6/2011 |
| WO | 2007004297 | 1/2007 |
| WO | 2011137699 A1 | 11/2011 |
| WO | 2011150315 | 12/2011 |
| WO | 2013148546 | 10/2013 |
| WO | 2014004585 | 1/2014 |
| WO | 2016014596 | 1/2016 |
| WO | 2016014598 | 1/2016 |
| WO | 2016115627 | 7/2016 |
| WO | 2016176642 | 11/2016 |
| WO | 2016183230 | 11/2016 |
| WO | 2016183240 | 11/2016 |
| WO | 2016209848 | 12/2016 |
| WO | 2017003952 | 1/2017 |
| WO | 2017011478 | 1/2017 |

OTHER PUBLICATIONS

Notice of Allowance for U.S. Appl. No. 13/117,119, dated Feb. 28, 2014, 13 pages.
Banelli, P. et al., "Modulation Formats and Waveforms for 5G Networks: Who Will Be the Heir of OFDM?," IEEE Signal Processing Magazine, vol. 81, pp. 80-93, Nov. 2014.
El Hattachi, R. et al., "NGMN 5G Initiative White Paper," NGMN Alliance, Feb. 17, 2015. [Online]. Available: https://www.ngmn.org/uploads/media/NGMN_5G_White_Paper_V1_0.pdf, 125 pages.
Rusek, F. et al., "Scaling Up MIMO, Opportunities and Challenges with Very Large Arrays," IEEE Signal Processing Magazine, pp. 40-60 (2013).
Vodafone, "Cellular Internet of Things: Architectural Aspects," RP-150869, 3GPP RAN#68, Malmo, Sweden (Jun. 9, 2015), 19 pages.
Supplementary European Search Report for European Application No. 11787483.4, dated Sep. 9, 2014, 6 pages.
International Search Report and Written Opinion for International Application No. PCT/US2011/038302, dated Nov. 15, 2011, 8 pages.
International Preliminary Report on Patentability for International Application No. PCT/US2011/038302, dated Dec. 4, 2012, 7 pages.
Office Action for U.S. Appl. No. 13/117,124, dated Feb. 22, 2013, 7 pages.
Notice of Allowance for U.S. Appl. No. 13/117,124, dated Aug. 8, 2013, 10 pages.
Office Action for U.S. Appl. No. 14/605,957, dated Jun. 22, 2017, 6 pages.
Supplementary European Search Report for European Application No. 13809004.8, dated Apr. 14, 2016, 8 pages.
Communication Pursuant to Article 94(3) EPC for European Application No. 13809004.8, dated Feb. 17, 2017, 5 pages.
Notice of Allowance for U.S. Appl. No. 13/927,087, dated Feb. 25, 2015, 9 pages.
Office Action for U.S. Appl. No. 13/927,087, dated Nov. 12, 2014, 14 pages.
Gurevich, S. et al. "Group Representation Design of Digital Signals and Sequences," S.W. Golomb et al. (eds.), SETA 2008, LNCS 5203, pp. 153-166, Springer-Verlag Berlin Heidelberg (2008).
International Search Report and Written Opinion for International Application No. PCT/US2013/047723, dated Oct. 29, 2013, 17 pages.
International Preliminary Report on Patentability for International Application No. PCT/US2013/047723, dated Dec. 31, 2014, 15 pages.
Notice of Allowance for U.S. Appl. No. 13/927,088, dated Feb. 18, 2015, 7 pages.
Office Action for U.S. Appl. No. 13/927,088, dated Nov. 28, 2014, 13 pages.
Notice of Allowance for U.S. Appl. No. 13/927,086, dated Dec. 26, 2014, 8 pages.
Supplemental Notice of Allowability for U.S. Appl. No. 13/927,086, dated Mar. 19, 2015, 4 pages.
Office Action for U.S. Appl. No. 13/927,086, dated Oct. 14, 2014, 10 pages.
Office Action for U.S. Appl. No. 13/927,089, dated Dec. 24, 2014, 13 pages.
Office Action for U.S. Appl. No. 13/927,089, dated Aug. 14, 2015, 7 pages.
Supplemental Notice of Allowability for U.S. Appl. No. 13/927,091, dated Jun. 11, 2015, 4 pages.
Notice of Allowance for U.S. Appl. No. 13/927,091, dated Apr. 24, 2015, 8 pages.
Office Action for U.S. Appl. No. 13/927,091, dated Jan. 27, 2015, 15 pages.

(56) References Cited

OTHER PUBLICATIONS

Office Action for U.S. Appl. No. 13/927,092, dated Oct. 8, 2014, 5 pages.
Notice of Allowance for U.S. Appl. No. 13/927,092, dated Oct. 24, 2014, 7 pages.
Office Action for U.S. Appl. No. 13/927,095, dated Apr. 30, 2015, 11 pages.
Office Action for U.S. Appl. No. 13/927,095, dated Nov. 4, 2015, 9 pages.
Office Action for U.S. Appl. No. 13/927,095, dated Jun. 1, 2016, 10 pages.
Office Action for U.S. Appl. No. 14/717,886, dated Apr. 19, 2016, 10 pages.
Office Action for U.S. Appl. No. 14/709,377, dated Dec. 11, 2015, 12 pages.
Office Action for U.S. Appl. No. 14/709,377, dated Jul. 13, 2016, 17 pages.
Examination Report No. 1 for Australian Application No. 2013239970, dated Dec. 8, 2015, 3 pages.
"AT&T Annual Report 2014," Opening Our Network [Online]. Retrieved from the Internet: Sep. 22, 2016. <URL: http://www.att.com/Investor/ATT_Annual/2014/att_introduces_new_concepts_for_telecom_network.html>, 5 pages.
CATT, "UL ACK/NACK transmission methods for LTE-A," 3GPP TSG RAN WG1 Meeting #60bis, R1-102453, Beijing, China, Apr. 12-16, 2010, 8 pages.
Toskala, A. et al., "Physical Layer," Chapter 5 In: "LTE for UMTS: OFDMA and SC-FDMA Based Radio Access," Holma, H. et al. (eds.), John Wiley & Sons, Ltd., United Kingdom, 2009, pp. 83-135.
Mecklenbrauker, W., "A Tutorial on Non-Parametric Bilinear Time-Frequency Signal Representations," In: Time and Frequency Representation of Signals and Systems, Longo, G. et al. (eds.), Springer-Verlag Wien, vol. 309, pp. 11-68 (1989).
Nehorai, A. et al., "MURI: Adaptive waveform design for full spectral dominance (2005-2010)," AFOSR FA9550-05-1-0443, Final Report, [online], Mar. 11, 2011 Retrieved on May 11, 2013, Retrieved from the Internet <URL http://oai.dtic.mil/oai/oai?verb=getRecord&metadataPrefix=html&identifier=ADA565420>, 103 pages.
Office Action for Japanese Application No. 2015-518647, dated Jul. 7, 2015, 10 pages.
Office Action for U.S. Appl. No. 14/754,596, dated Apr. 19, 2016, 18 pages.
Office Action for U.S. Appl. No. 14/809,129, dated Jul. 19, 2016, 5 pages.
Office Action for U.S. Appl. No. 15/617,962, dated Sep. 6, 2017, 10 pages.
International Search Report and Written Opinion for International Application No. PCT/US2016/050825, dated Feb. 8, 2017, 12 pages.
International Search Report and Written Opinion for International Application No. PCT/US2016/052524, dated Dec. 20, 2016, 8 pages.
Office Action for U.S. Appl. No. 15/374,995, dated Aug. 7, 2017, 6 pages.
International Search Report and Written Opinion for International Application No. PCT/US2017/025797, dated Jun. 21, 2017, 6 pages.
International Search Report and Written Opinion for International Application No. PCT/US2016/030259, dated Aug. 4, 2016, 13 pages.
Office Action for U.S. Appl. No. 15/152,464, dated Apr. 6, 2017, 10 pages.
Examination Report No. 1 for Australian Application No. 2013280487, dated May 2, 2016, 3 pages.
International Search Report and Written Opinion for International Application No. PCT/US2016/031928, dated Oct. 7, 2016, 10 pages.
Office Action for U.S. Appl. No. 15/188,946, dated May 8, 2017, 14 pages.
International Search Report and Written Opinion for International Application No. PCT/US2016/038584, dated Sep. 26, 2016, 8 pages.
Office Action for U.S. Appl. No. 15/187,668, dated Feb. 16, 2017, 6 pages.
International Search Report and Written Opinion for International Application No. PCT/US2016/031909, dated Aug. 11, 2016, 13 pages.
Office Action for U.S. Appl. No. 15/194,494, dated May 5, 2017, 16 pages.
International Search Report and Written Opinion for International Application No. PCT/US2016/039662, dated Nov. 29, 2016, 14 pages.
Office Action for U.S. Appl. No. 15/436,653, dated Jun. 2, 2017, 10 pages.
Office Action for U.S. Appl. No. 15/208,545, dated Aug. 21, 2017, 15 pages.
International Search Report and Written Opinion for International Application No. PCT/US2016/041940, dated Oct. 20, 2016, 8 pages.
Supplementary European Search Report for European Application No. 13768150.8, dated Oct. 30, 2015, 7 pages.
International Search Report and Written Opinion for International Application No. PCT/US2013/033652, dated Jun. 12, 2013, 8 pages.
International Search Report and Written Opinion for International Application No. PCT/US2015/041417, dated Oct. 1, 2015, 7 pages.
Office Action for U.S. Appl. No. 14/805,407, dated Dec. 14, 2016, 7 pages.
International Search Report and Written Opinion for International Application No. PCT/US2015/041420, dated Oct. 1, 2015, 6 pages.
Julia Prodan et al., "Pilot-assisted channel estimation without feedback for bi-directional broadband ANC", Communications (APCC), 2011 17th Asia-Pacific Conference On, IEEE, Oct. 2, 2011, pp. 157-162.
Extended European Search Report for Application No. 17776702.7 dated Oct. 11, 2019, 10 pages.
Office Action for EP counterpart, EP Application No. 17776702.7, dated Jun. 25, 2021, 7 pages.

\* cited by examiner

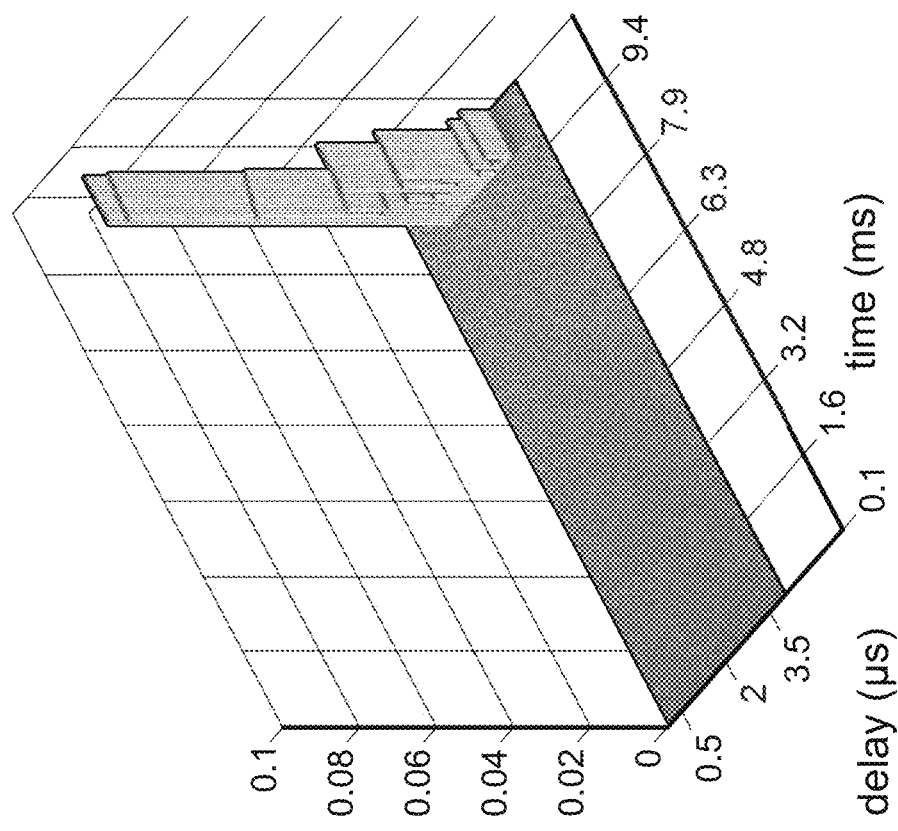
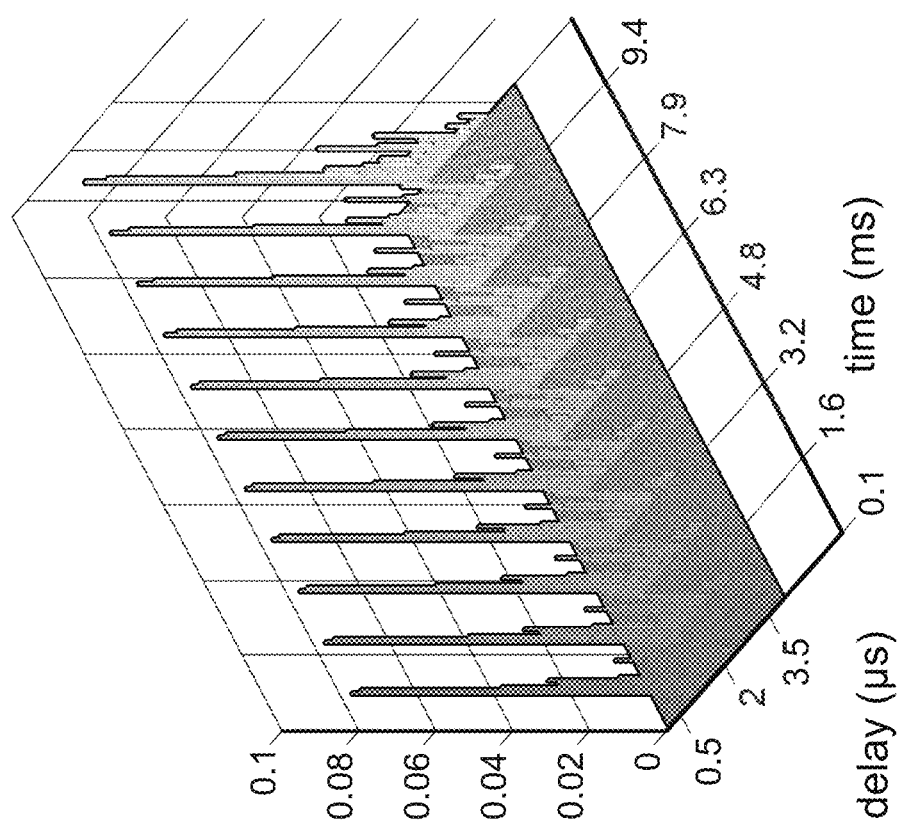
FIG. 10

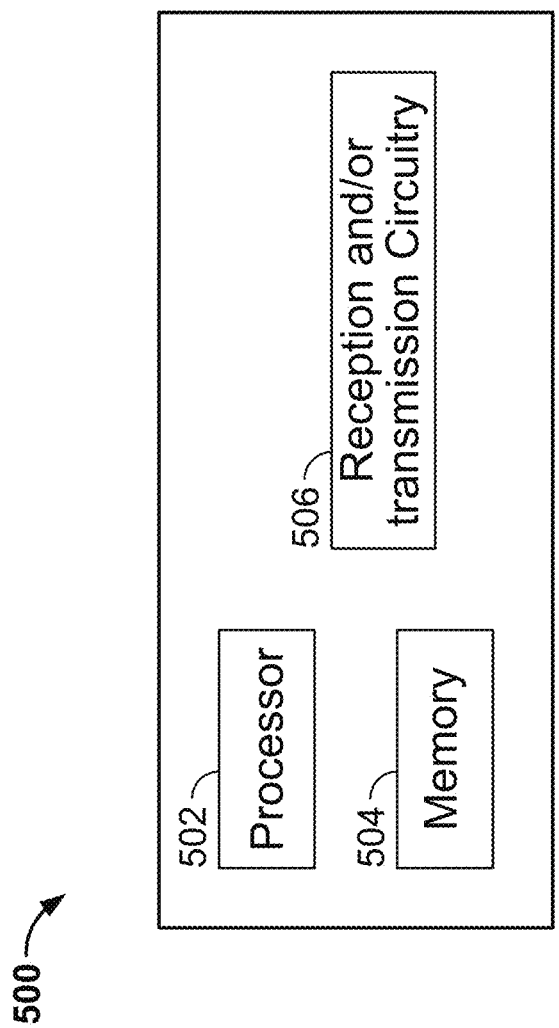

CHANNEL ACQUISITION USING ORTHOGONAL TIME FREQUENCY SPACE MODULATED PILOT SIGNALS

CROSS-REFERENCE TO RELATED APPLICATIONS

This patent document is a continuation of U.S. application Ser. No. 16/143,193, entitled "CHANNEL ACQUISITION USING ORTHOGONAL TIME FREQUENCY SPACE MODULATED PILOT SIGNALS" filed Sep. 26, 2018, which is a continuation of PCT Application No. PCT/US2017/025166, entitled "CHANNEL ACQUISITION USING ORTHOGONAL TIME FREQUENCY SPACE MODULATED PILOT SIGNALS" filed on Mar. 30, 2017, which claims priority to U.S. Provisional Application Ser. No. 62/316,437, entitled "CHANNEL ACQUISITION USING ORTHOGONAL TIME FREQUENCY SPACE MODULATED PILOT SIGNALS" filed on Mar. 31, 2016. The entire content of the aforementioned patent applications is incorporated by reference herein.

TECHNICAL FIELD

The present document relates to wireless communication, and more particularly, to receiver-side processing of orthogonal time frequency space (OTFS) domain modulated signals.

BACKGROUND

Due to an explosive growth in the number of wireless user devices and the amount of wireless data that these devices can generate or consume, current wireless communication networks are fast running out of bandwidth to accommodate such a high growth in data traffic and provide high quality of service to users.

Various efforts are underway in the telecommunication industry to come up with next generation of wireless technologies that can keep up with the demand on performance of wireless devices and networks.

SUMMARY

This document discloses receiver-side techniques for performing channel estimation, or channel acquisition, from received signals that include OTFS pilot signals.

In one example aspect, a wireless communication method for recovering information bits from a received signal, implemented by a wireless communication receiver is disclosed. The method includes receiving a wireless signal comprising a data signal portion and a pilot signal portion wherein the pilot signal portion includes multiple pilot signals multiplexed together in an orthogonal time frequency space (OTFS) domain, performing two-dimensional channel estimation in a time-frequency domain based on a minimum mean square error (MMSE) optimization criterion, and recovering information bits using a channel estimate obtained from the two-dimensional channel estimation.

In another example aspect, a technique for recovering information bits from a received signal, implemented by a wireless communication receiver is disclosed. The technique includes receiving, over a communication channel. a wireless signal comprising a data signal portion and a pilot signal portion wherein the pilot signal portion includes multiple pilot signals multiplexed together in an orthogonal time frequency space (OTFS) domain, transforming the received wireless signal into a delay-time domain signal, applying a delay-time domain mask to separate out each of the multiple pilot signal's contribution to the delay-time domain signal into corresponding separate received pilot signal contributions, estimating, using the separate received pilot signal contributions, the communication channel estimates at delay-time domain positions of the multiple pilot signals, and interpolating the communication channel estimates to obtain an entire communication channel estimate.

In yet another aspect, a wireless communication method for recovering information bits from a received signal, implemented by a wireless communication receiver is disclosed. The method includes receiving, over a communication channel. a wireless signal comprising a data signal portion and a pilot signal portion wherein the pilot signal portion includes multiple pilot signals multiplexed together in an orthogonal time frequency space (OTFS) domain, transforming the received wireless signal into a delay-Doppler domain signal by applying a two-dimensional symplectic Fourier transform, applying a delay-Doppler domain mask to separate out each of the multiple pilot signal's contribution to the time-frequency domain signal into corresponding separate received pilot signal contributions, estimating, using the separate received pilot signal contributions, the communication channel estimates at delay-Doppler domain positions of the multiple pilot signals, and interpolating the communication channel estimates to obtain an entire communication channel estimate.

These, and other, features are described in this document.

DESCRIPTION OF THE DRAWINGS

Drawings described herein are used to provide a further understanding and constitute a part of this application. Example embodiments and illustrations thereof are used to explain the technology rather than limiting its scope.

FIG. 10 is a graph showing an example interpolation problem. Left: channel response measured on the pilot sub-lattice. Right: desired channel response.

zooms into the region where channel estimation is desired. The spline provides an excellent estimator of the channel.

Figure 13:
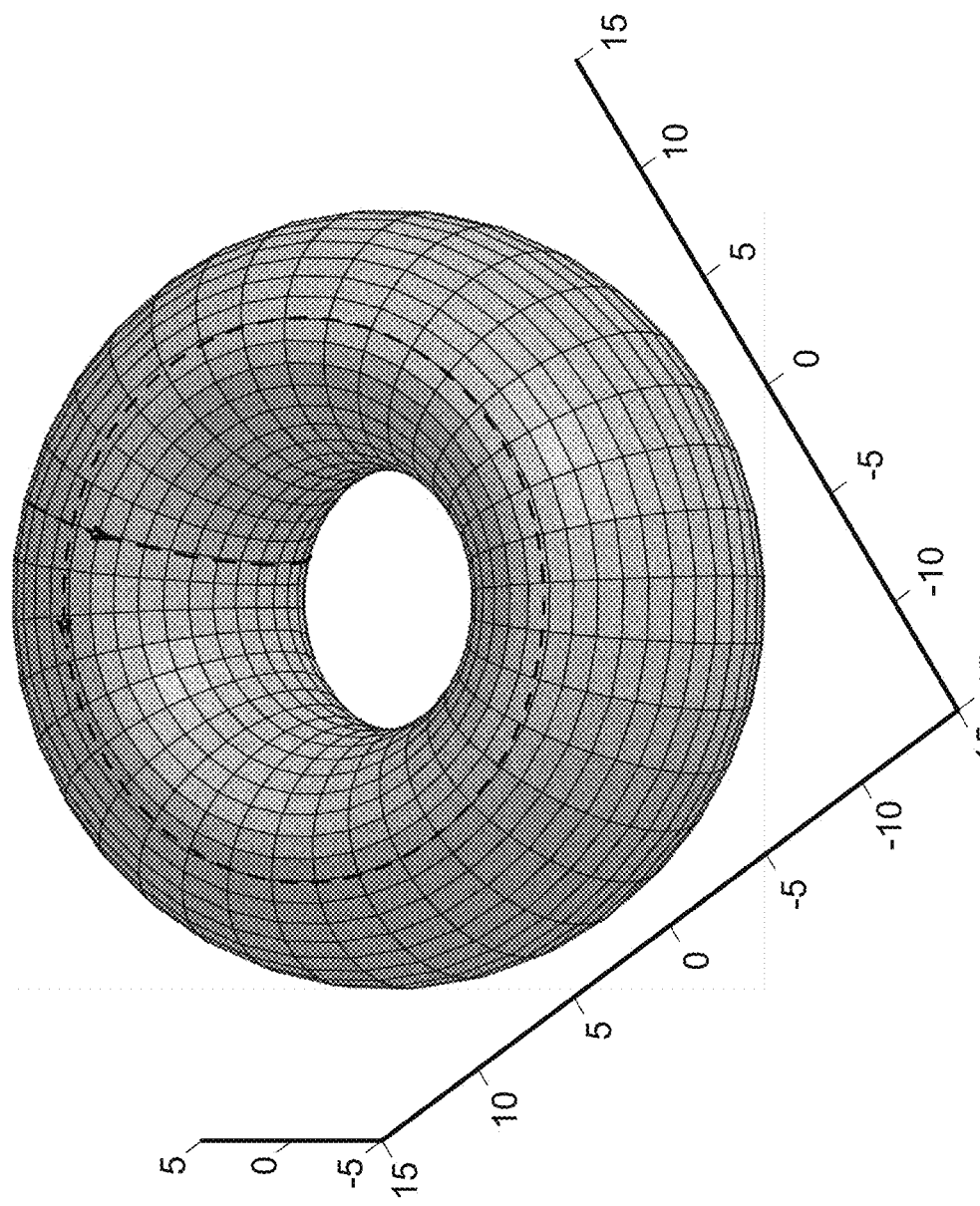

FIG. 13 shows an example of a torus with a larger delay circumference than Doppler circumference.

Figure 14:
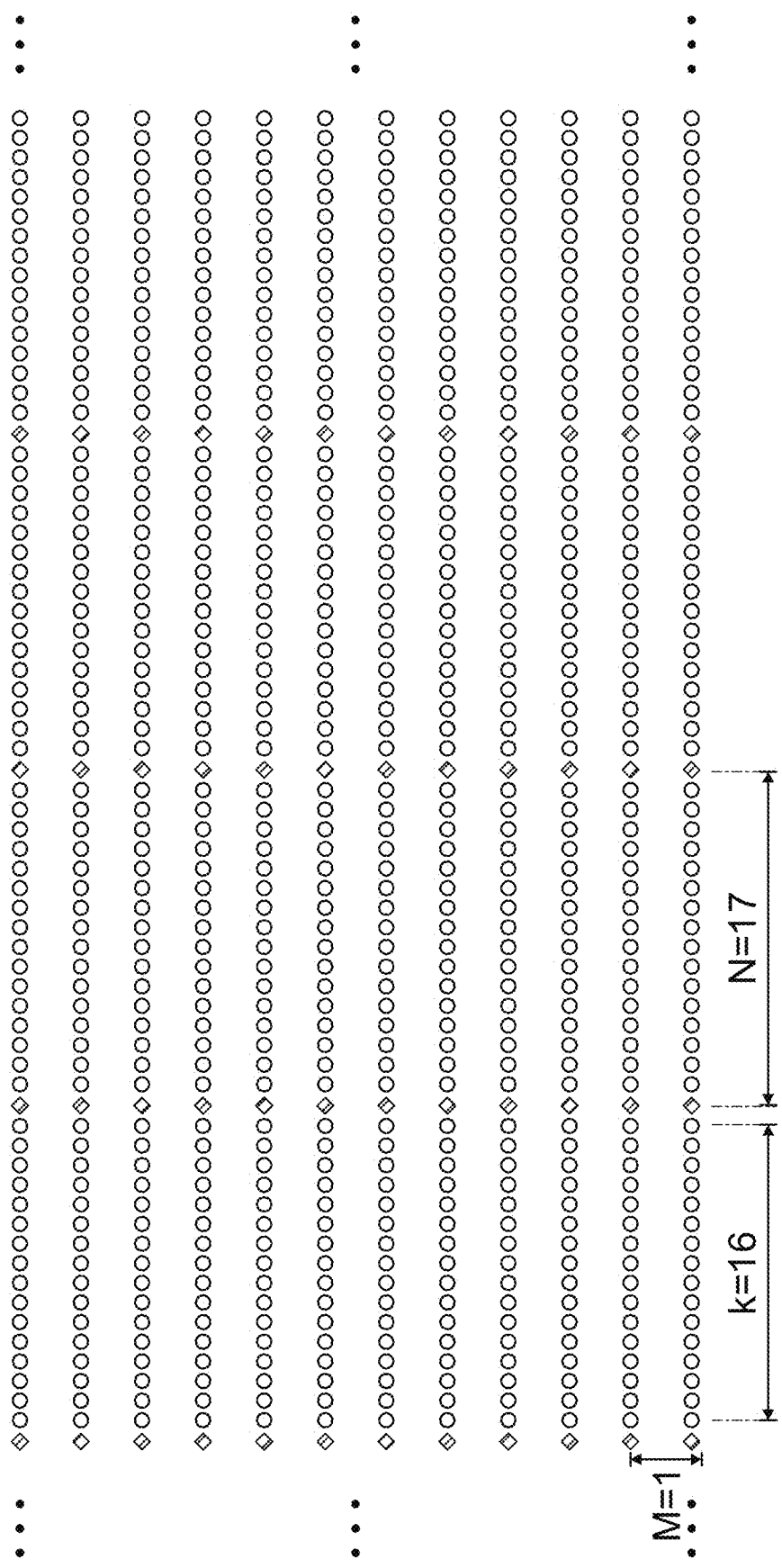

FIG. 14 shows examples of t-f Plane of Pilot (red) and Data (green) when k=N−1 and M=1.

Figure 15:
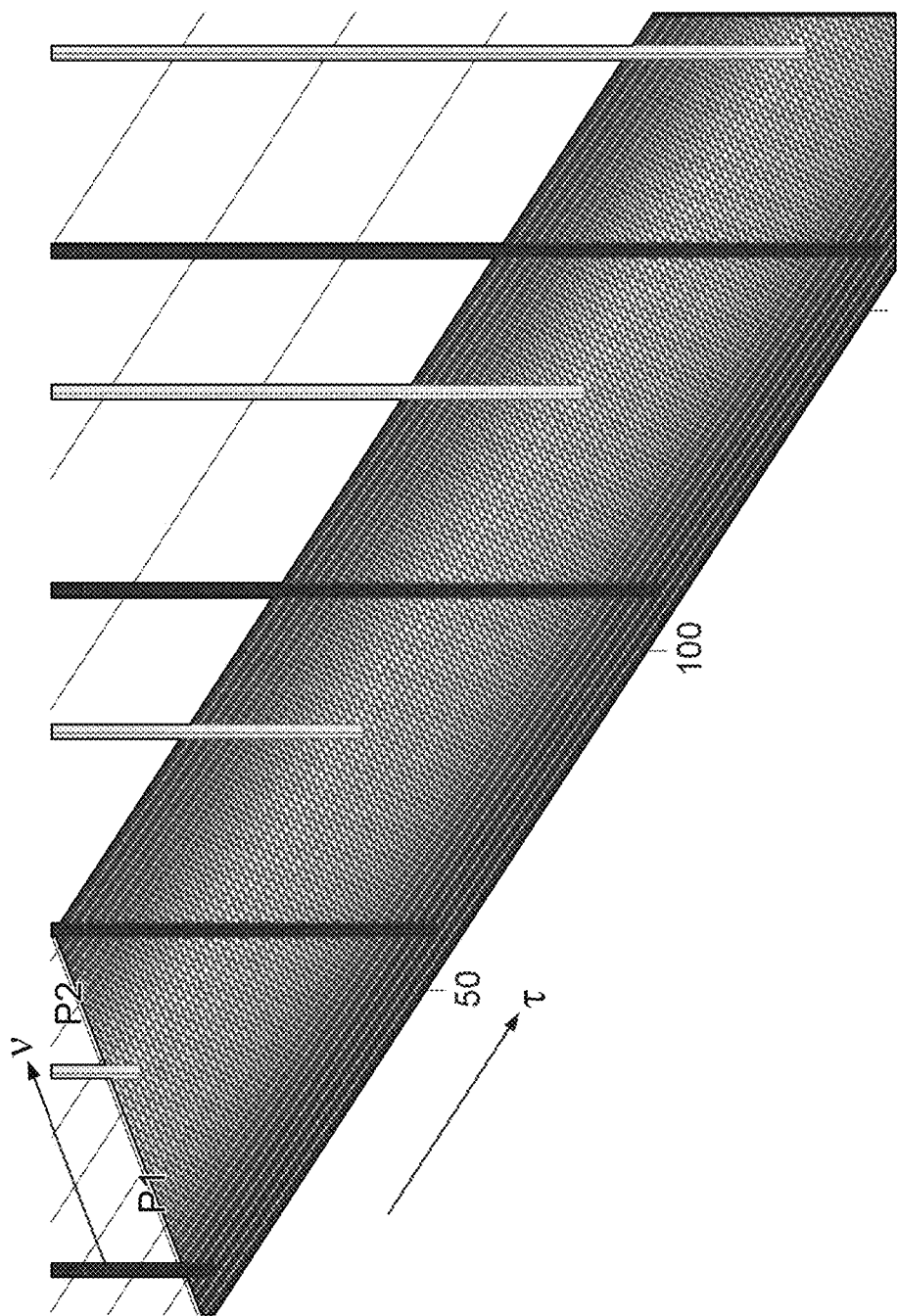

FIG. 15 is a graph showing an example of packing of 8 pilots (4×2) in the Delay-Doppler plane.

Figure 16:
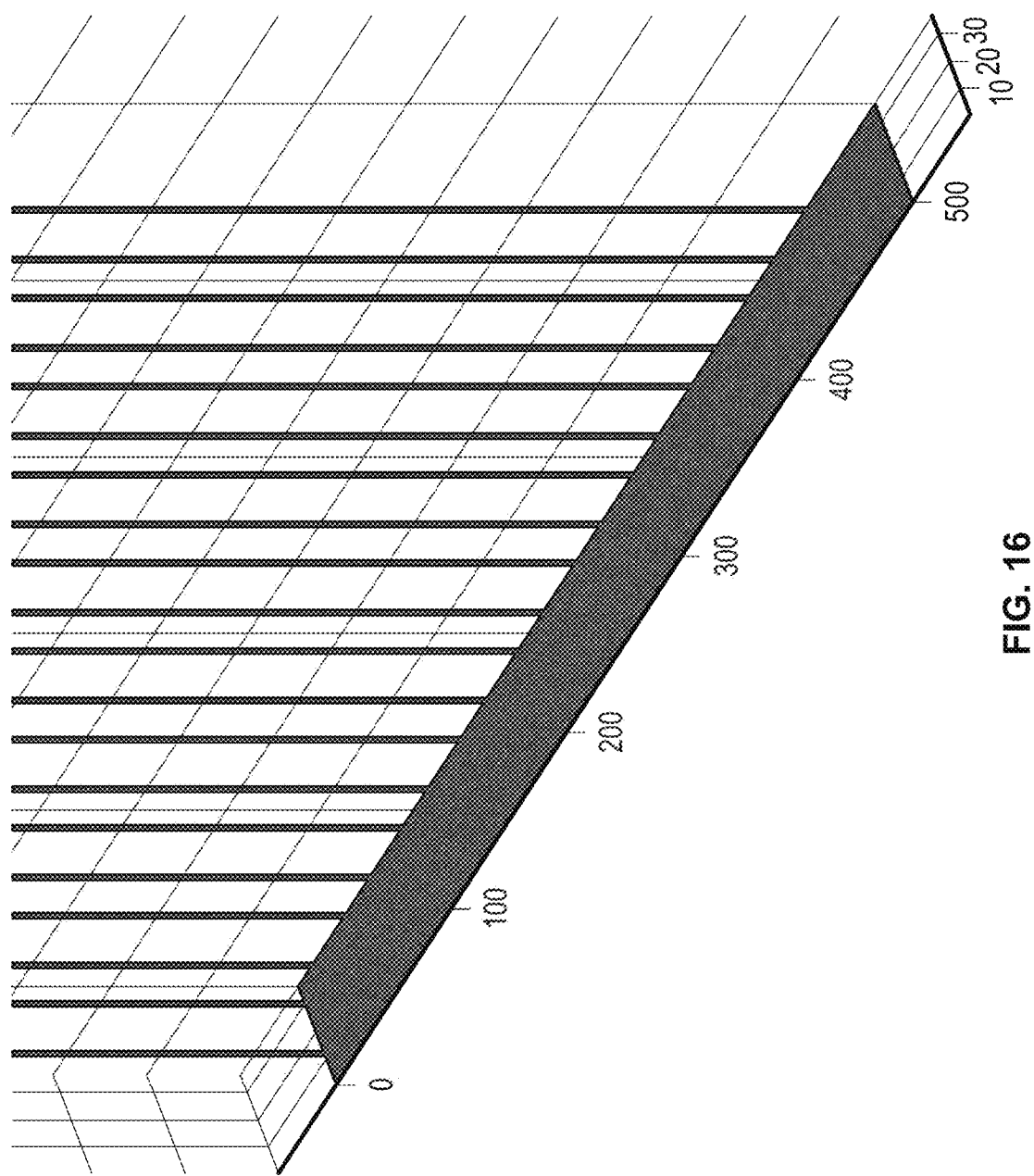

FIG. 16 shows an example embodiment with 20 pilots in the Delay-Doppler plane in lattice points (5+i50,9+j18), i=0 to 49, j=0,1

Figure 17:
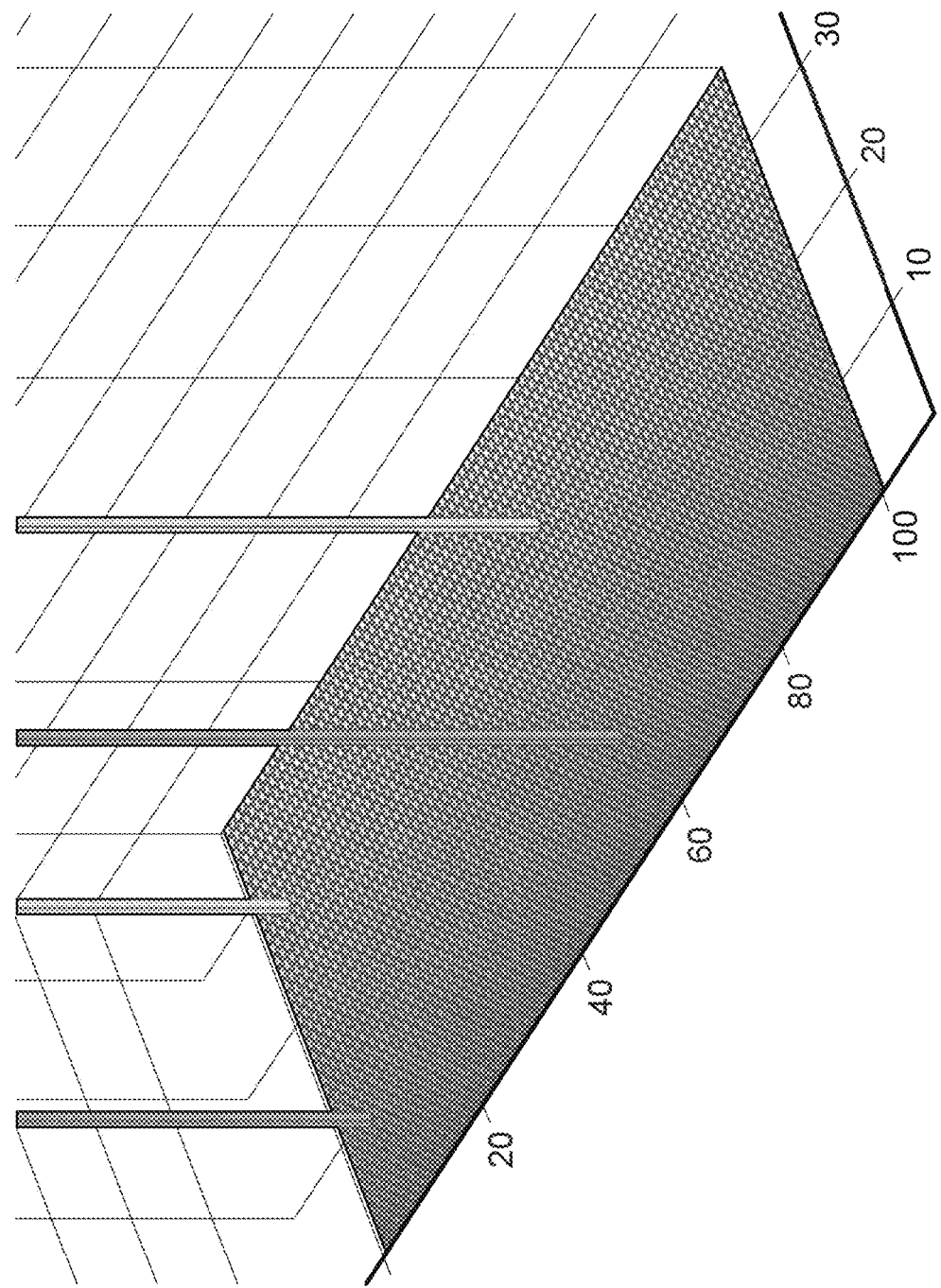

FIG. 17 is a zoomed in picture of the example pilots in FIG. 16.

Figure 18:
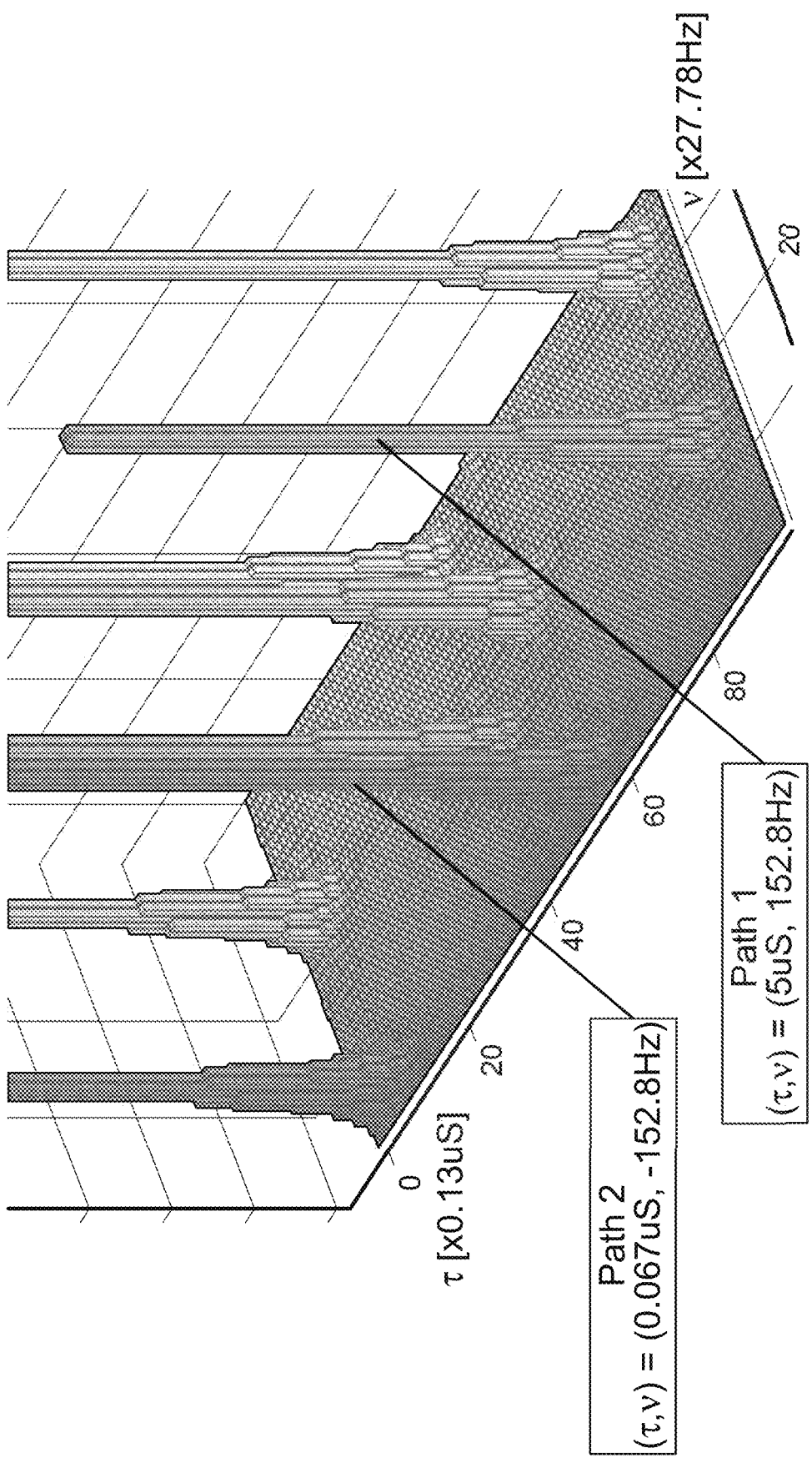

FIG. 18 is a graph showing examples of received pilots after going through a channel with two delay-Doppler paths (showing 4 pilots).

Figure 19:
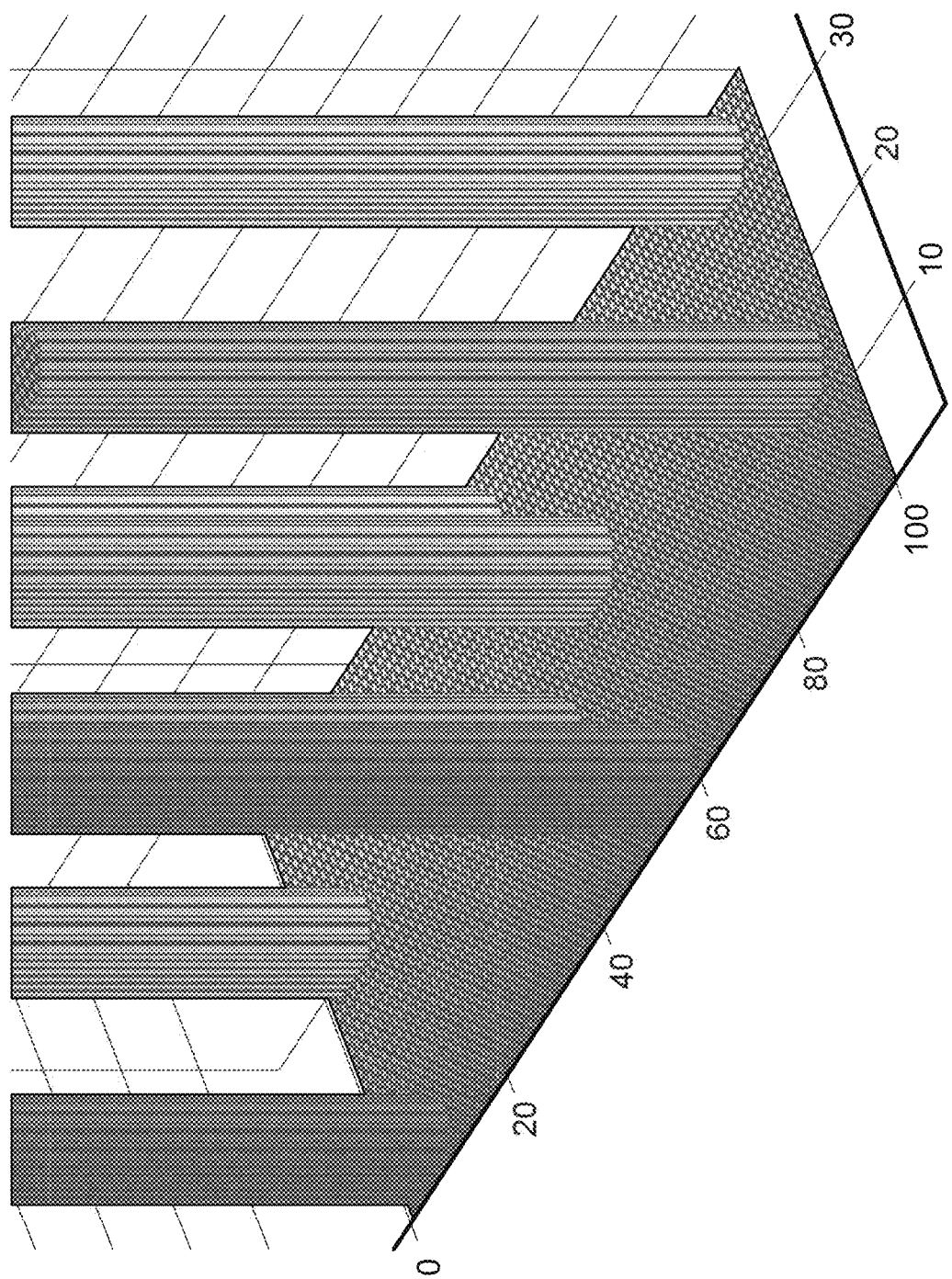

FIG. 19 shows an example of markers of received signal levels above −40 dB of received pilot peak.

Figure 20:
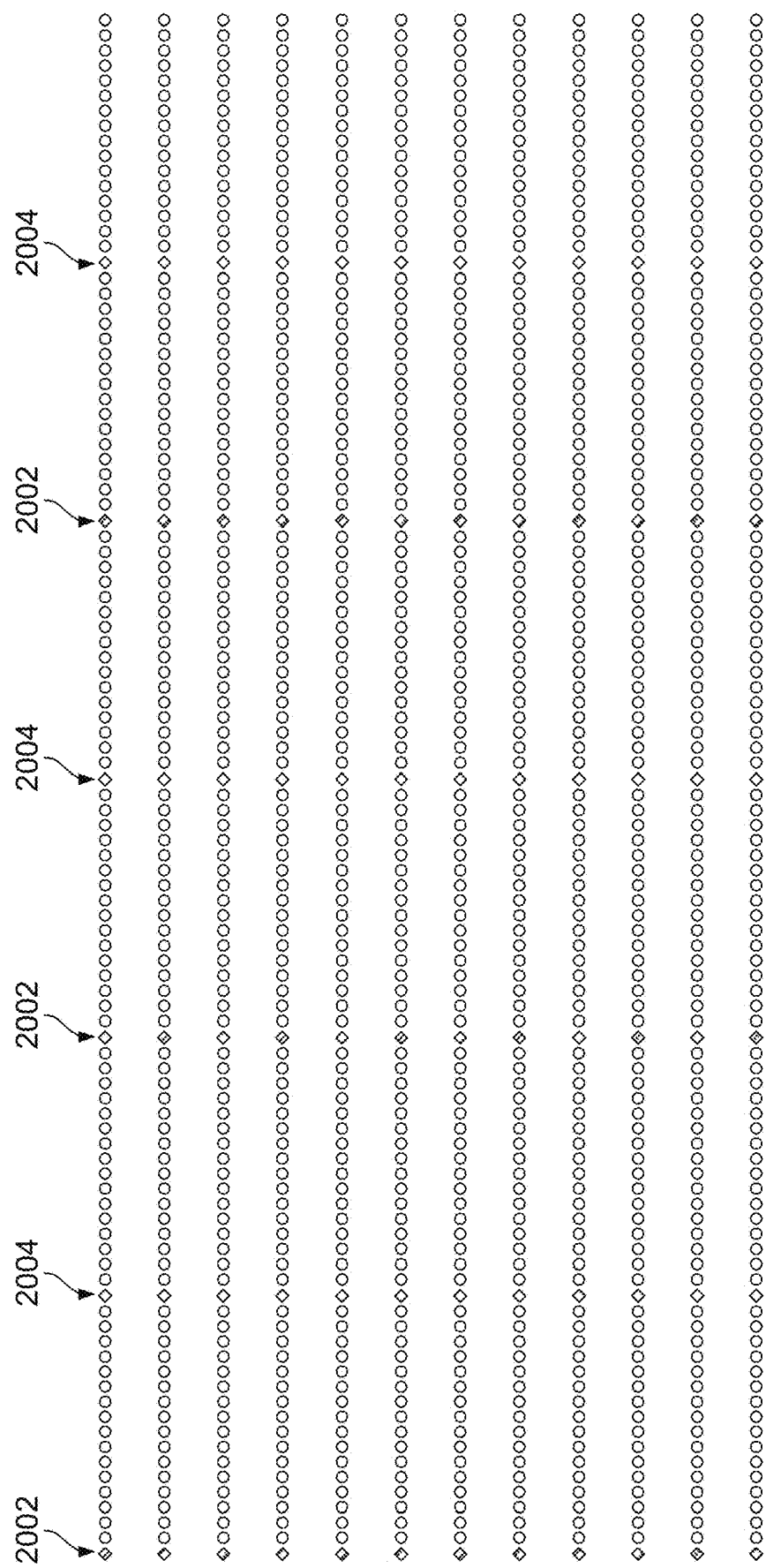

FIG. 20 shows an example of a t-f lattice showing the locations of two Time-Frequency Packed reference signals (red, purple) multiplexed with data (green).

Figure 21:
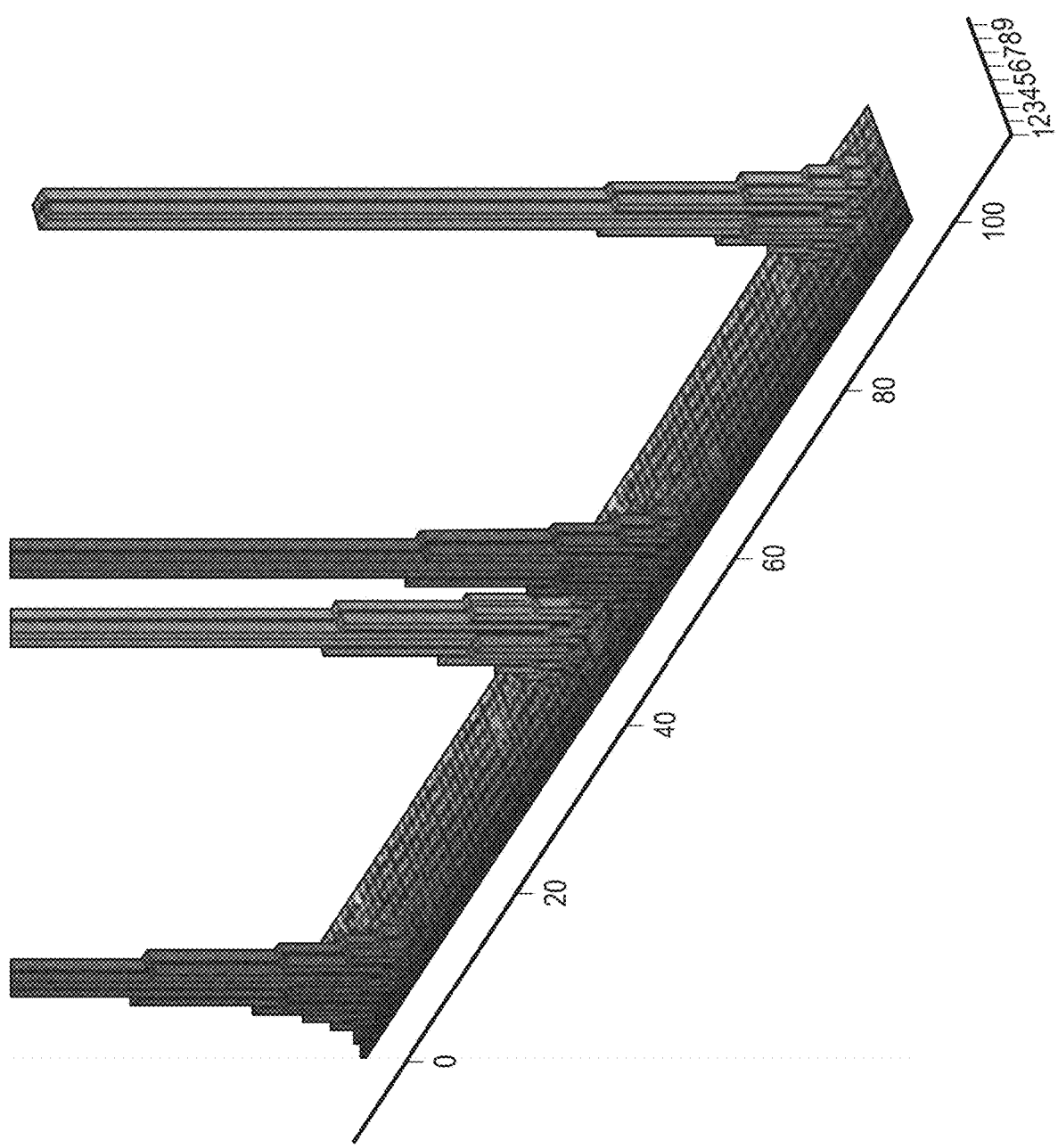

FIG. 21 shows an example of received pilots after going through a channel with two delay-Doppler paths (showing 2 pilots).

Figure 22:
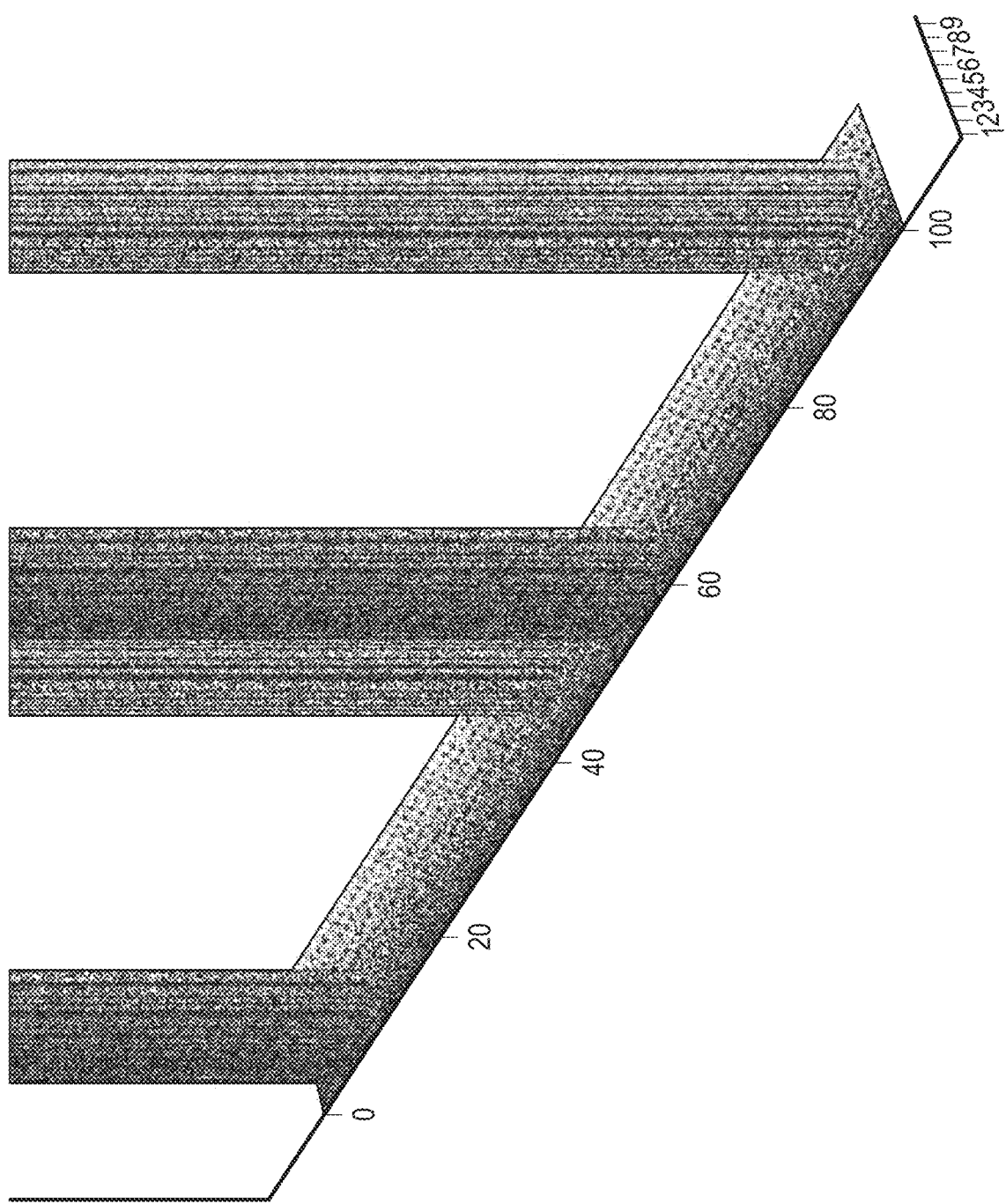

FIG. 22 shows an example of markers of received signal levels above −40 dB of received pilot peak.

Figure 23:
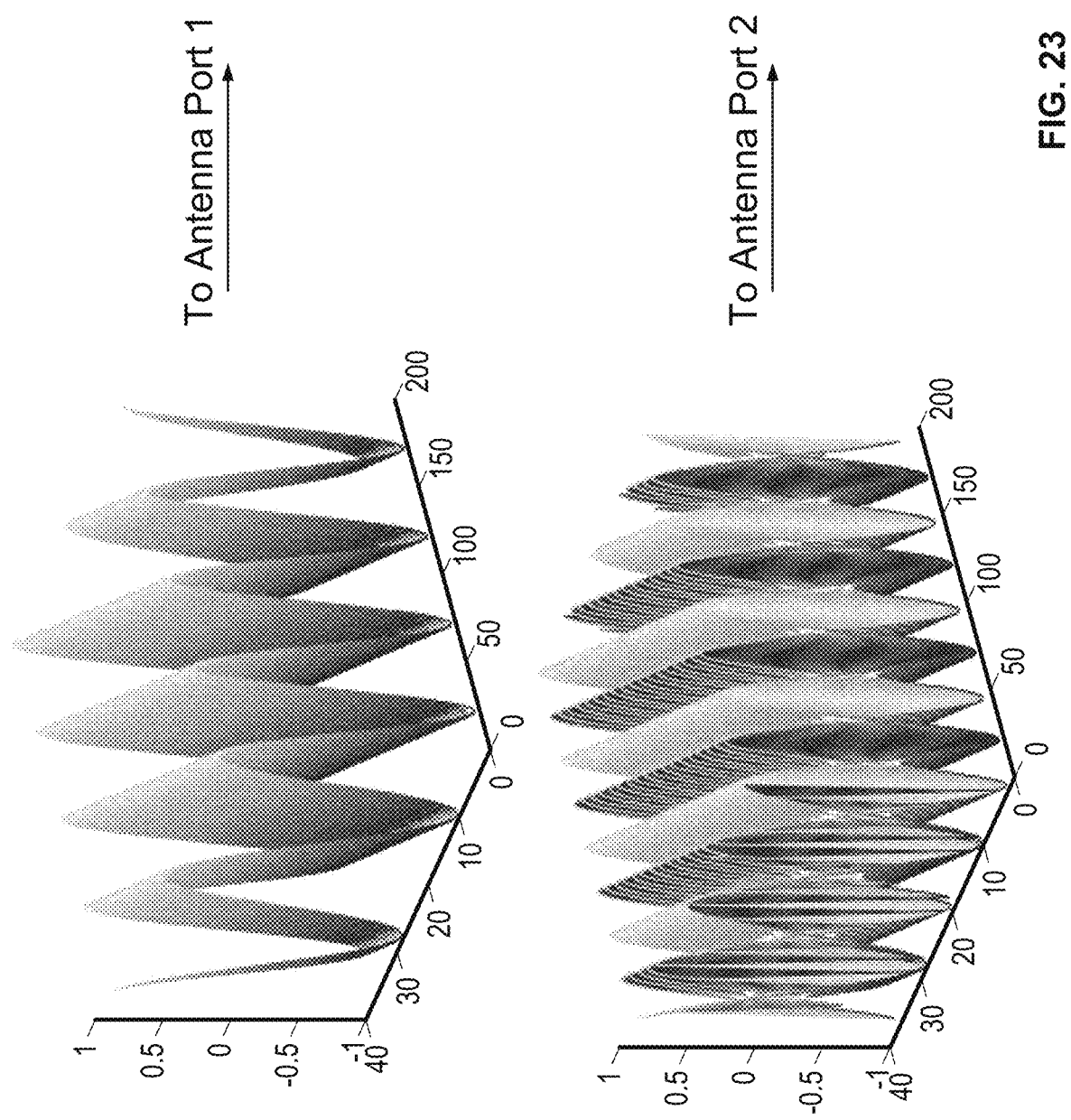

FIG. 23 shows an example of real parts of pilots P1 and P2 of FIG. 14 shown in t-f plane.

Figure 24:
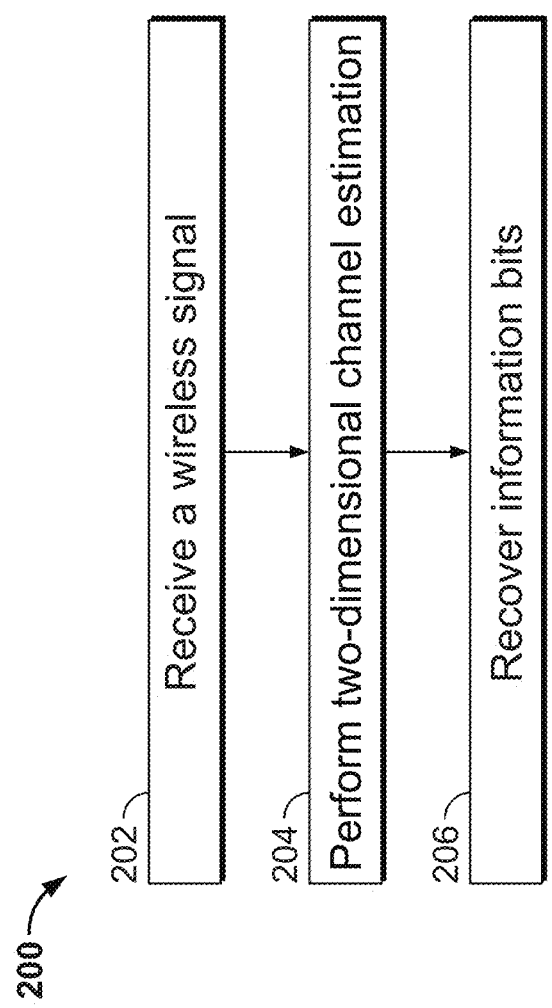

FIG. 24 shows a flowchart of an example wireless communication reception method.

Figure 25:
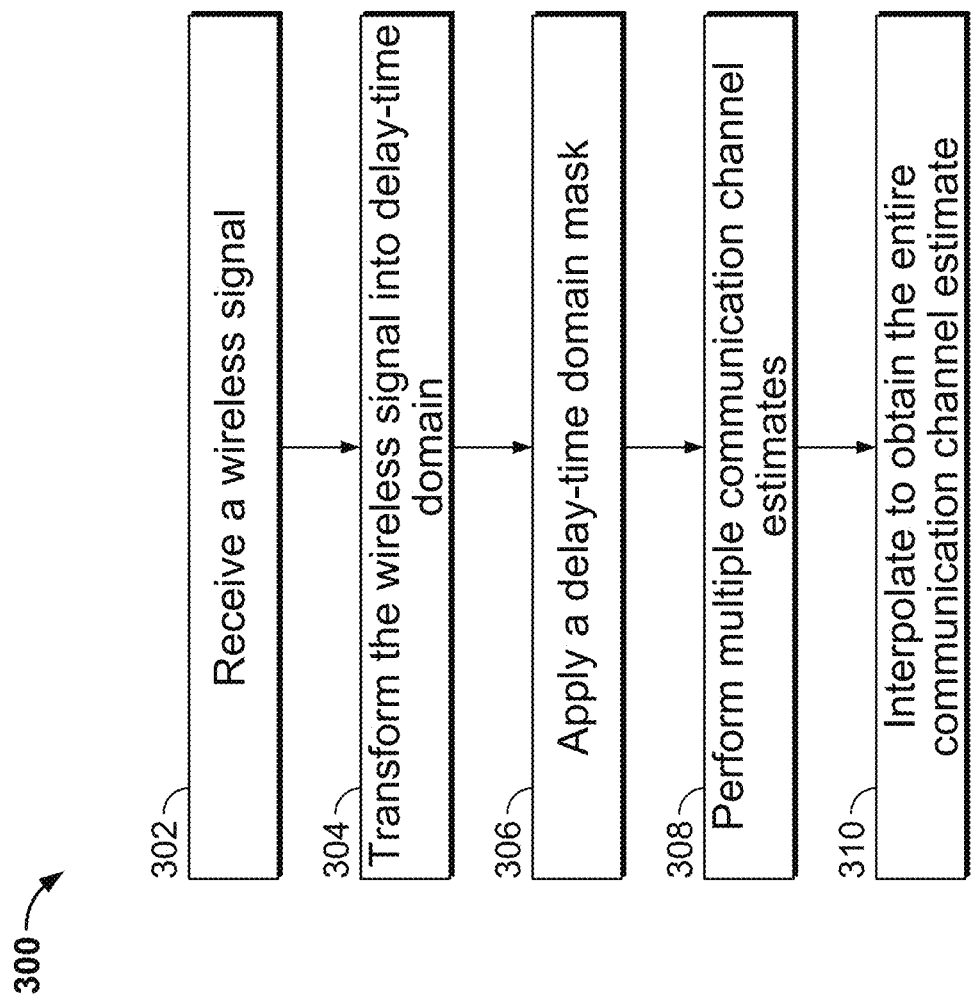

FIG. 25 shows a flowchart of another example wireless communication reception method.

Figure 26:
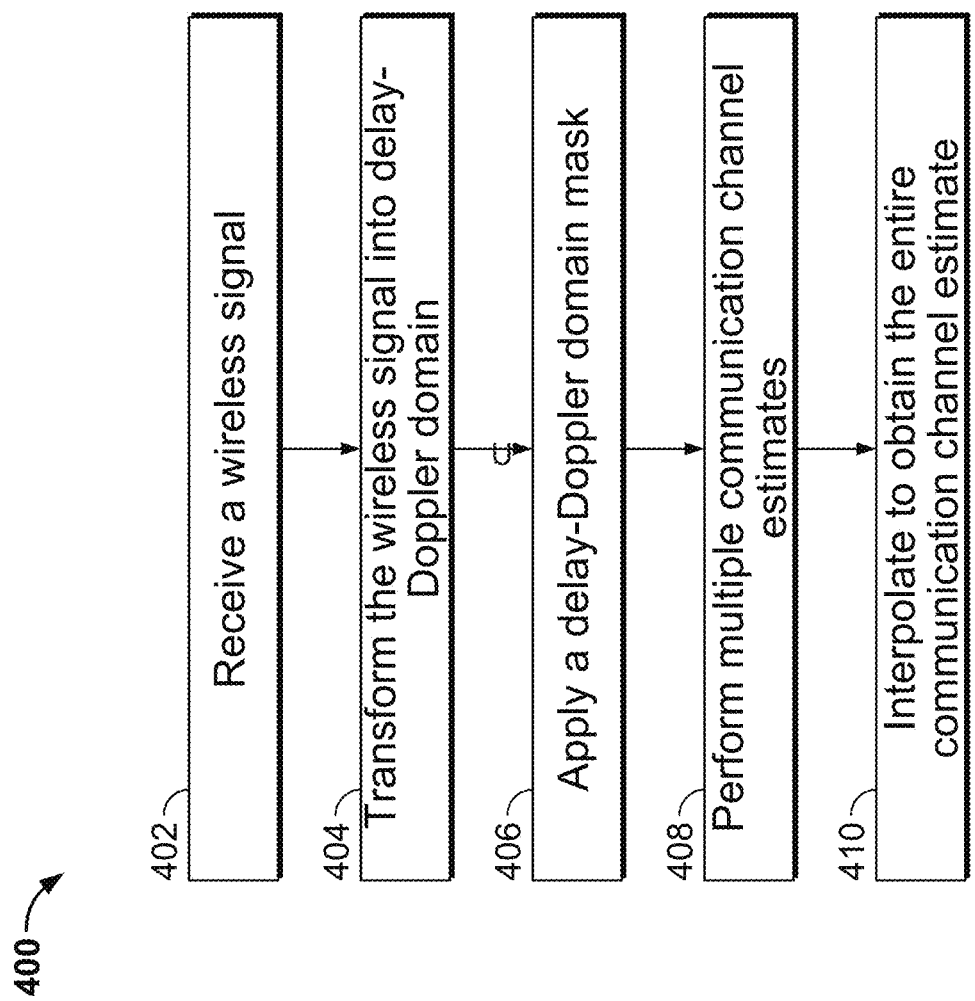

FIG. 26 shows a flowchart of another example wireless communication reception method.

FIG. 27 shows an example of a wireless transceiver apparatus.

DETAILED DESCRIPTION

To make the purposes, technical solutions and advantages of this disclosure more apparent, various embodiments are described in detail below with reference to the drawings. Unless otherwise noted, embodiments and features in embodiments of the present document may be combined with each other.

The present-day wireless technologies are expected to fall short in meeting the rising demand in wireless communications. Many industry organizations have started the efforts to standardize next generation of wireless signal interoperability standards. The 5th Generation (5G) effort by the 3rd Generation Partnership Project (3GPP) is one such example and is used throughout the document for the sake of explanation. The disclosed technique could be, however, used in other wireless networks and systems.

Section headings are used in the present document to improve readability of the description and do not in any way limit the discussion to the respective sections only.

Figure 1:
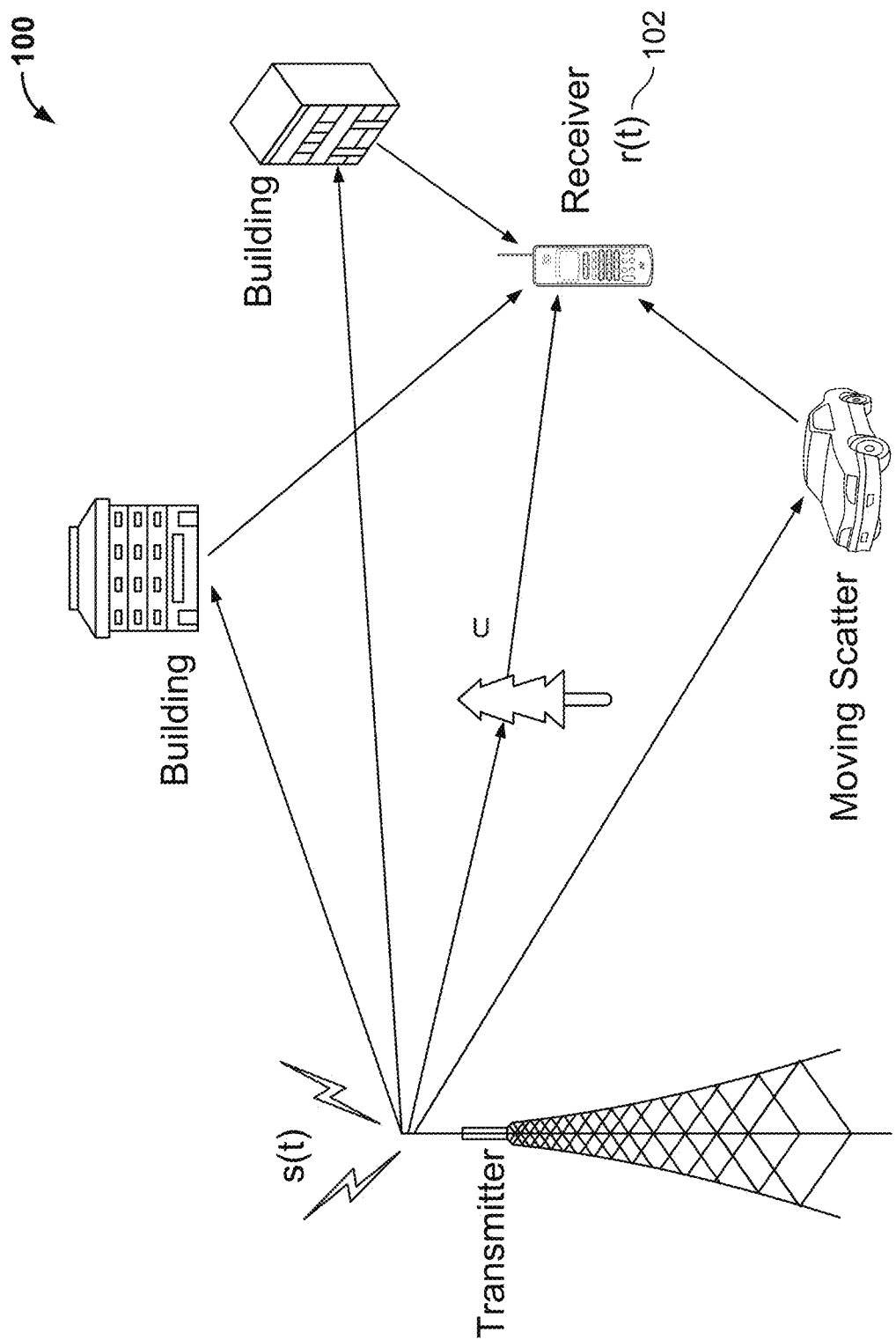
FIG. 1 shows an example communication network.

FIG. 1 shows an example communication network 100 in which the disclosed technologies can be implemented. The network 100 may include a base station transmitter that transmits wireless signals s(t) (downlink signals) to one or more receivers 102, the received signal being denoted as r(t), which may be located in a variety of locations, including inside or outside a building and in a moving vehicle. The receivers may transmit uplink transmissions to the base station, typically located near the wireless transmitter. The technology described herein may be implemented at a receiver 102.

As explained herein, channel acquisition, or channel estimation, of wireless signals that include OTFS pilots and data, may be performed in different ways. In some embodiments, OTFS pilot signals may, for example, be in the form of OTFS domain impulses.

1. Introduction

This document discloses different channel acquisition mechanisms using OTFS-based pilots. The theory and implementation of OTFS-based pilots is described in [1]. This document focuses on the description of multiple different ways of estimating the channel using these pilots.

2. Channel Acquisition

In the paradigm of OTFS channels are understood in two domains:

Time-Frequency domain. In this domain the channel acts by multiplication and looks like a linear combination of two dimensional waves.

Delay-Doppler domain. In this domain the channel acts by convolution and looks like a linear combination of two dimensional sincs.

The two channel domains are related by the symplectic Fourier transform.

The channel acquisition process incorporates pilot separation, channel interpolation, and/or channel prediction. The following sections will show different ways that the channel acquisition can be performed in different domains including a hybrid domain.

Figure 2:
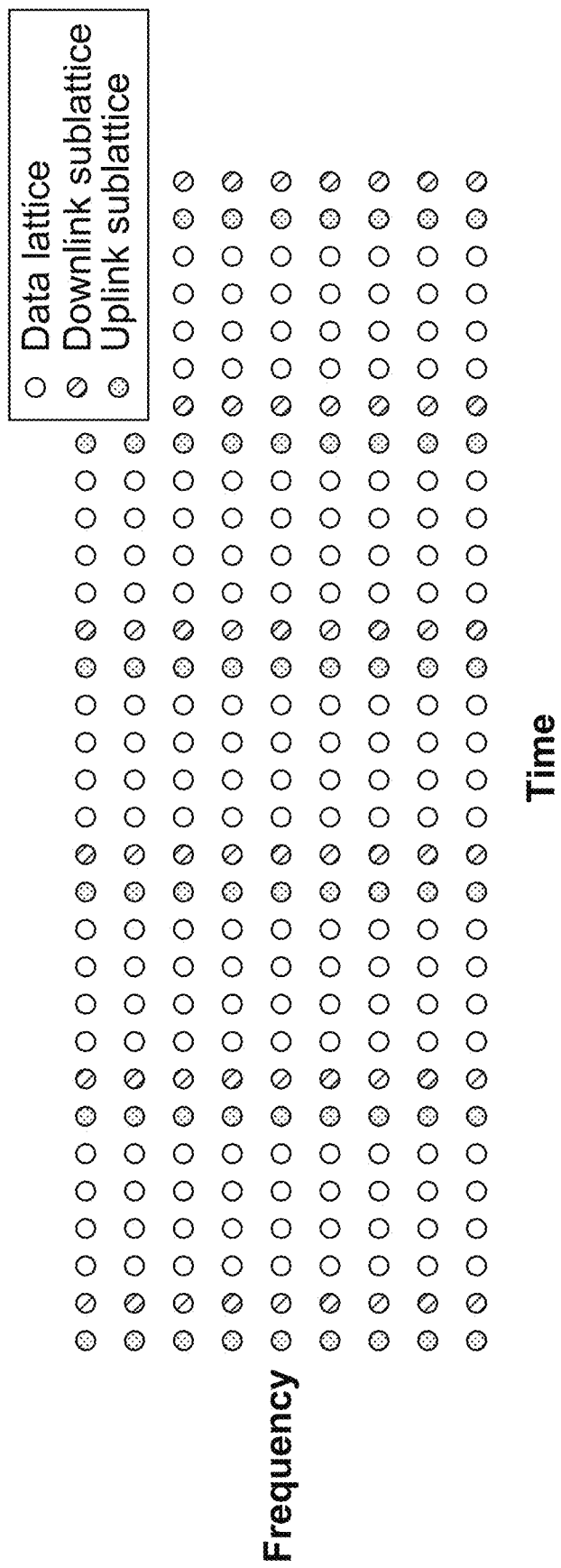
FIG. 2 is a graph showing an example decomposition of the Time-Frequency lattice into three pieces.

For the purpose of this document we assume that the Time-Frequency lattice is partitioned into two or more pieces. A fine lattice used for data transmission, and one or more coarse sub-lattices used for channel acquisition (pilot transmissions). FIG. 2 shows an example of a data lattice with two channel acquisition sub-lattices, one for the downlink and one for the uplink channel acquisitions.

Figure 3:
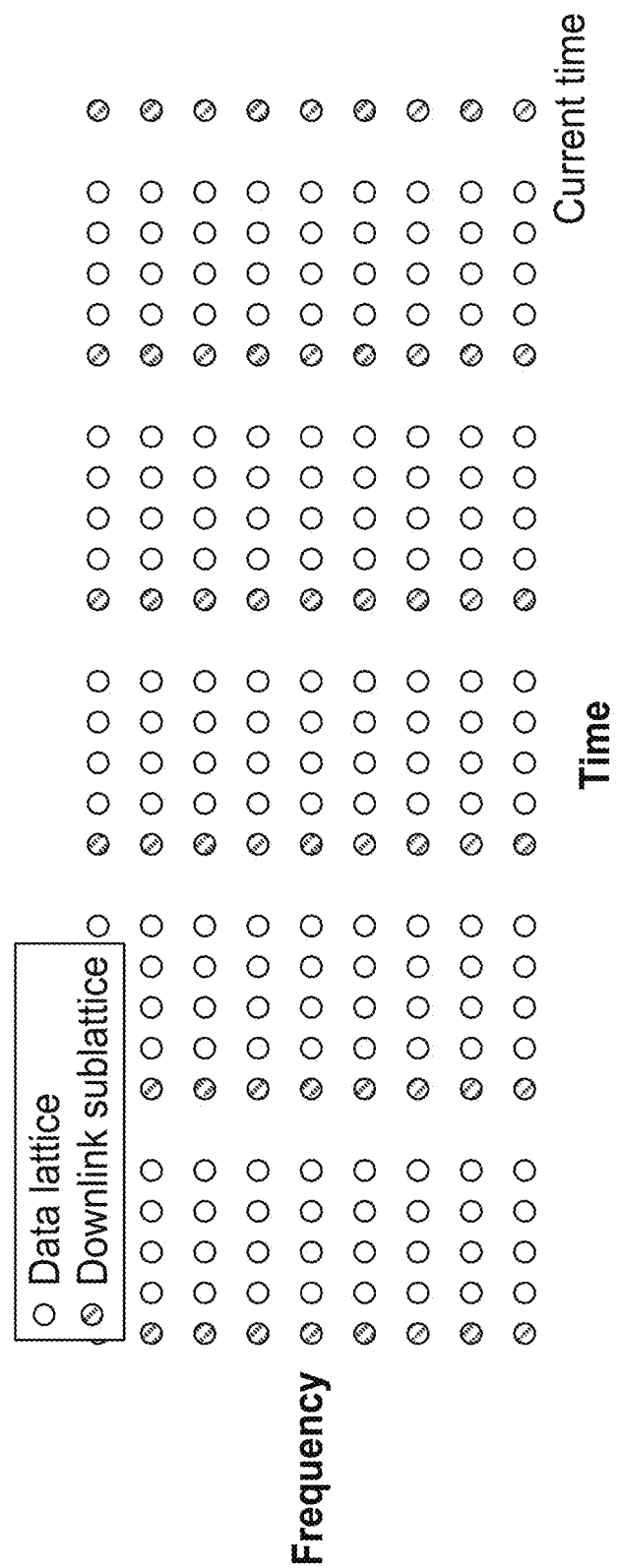
FIG. 3 is a graph showing example of an interpolation problem. After receiving distorted pilots on the downlink channel sub-lattice the remote estimates the channel on a past portion of the data lattice.
Figure 4:
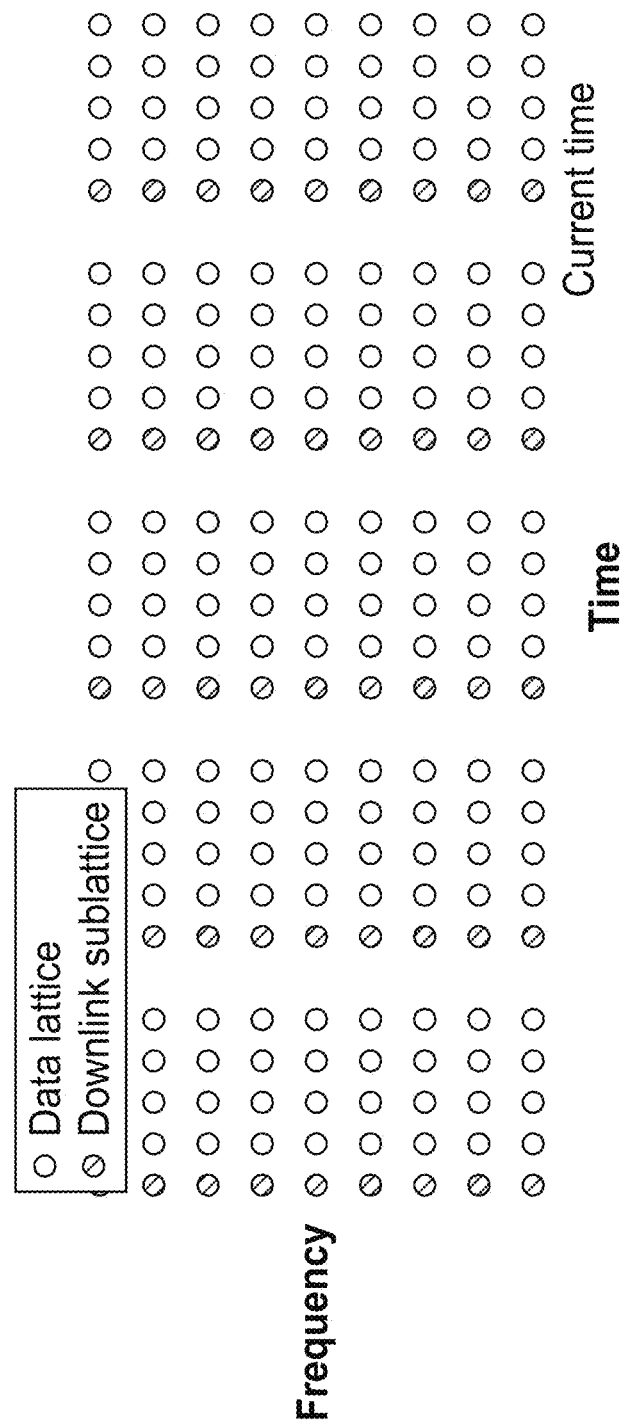
FIG. 4 is a graph showing an example of a Prediction problem. The remote estimates the channel on a future portion of the data lattice.

On the downlink sub-lattice the signal received by the remote's antennas is a linear combination of pilots transmitted by the hub's antennas distorted by the channel. The goal is for the remote to use this received signal to estimate the channel on some portion of the data lattice (for the remainder of the document we focus on the downlink as the problem is symmetric for the uplink). Channel acquisition can be separated into two problems: interpolation and prediction which are summarized in FIG. 3 and FIG. 4.

Channel interpolation is a much easier problem and is sufficient for receive equalizers. However, for transmit equalizers channel prediction is required.

3. Time-Frequency Domain Channel Acquisition

The channel acquisition methods described in this section utilize the Time-Frequency domain, and it can be applied to both pilot separation and channel interpolation and/or prediction.

One method is 2-D MMSE channel acquisition. The theory and mathematical formulas for implementing the 2-D MMSE channel acquisition is described in this document. One way is by performing the following operations:

(1) Generate the square autocorrelation matrix of the pilot for which the channel is being acquired $R_x$. The size of this matrix is N·M×N·M where NΔt×NΔf is the size of the observation domain.

(2) Calculate the cross-correlation matrix $R_{xy}$ by restricting $R_x$ as follows $R_{xy}=Rx \cdot RES^H$. The size of this matrix is N·M×P where P is the number of pilot samples in the observation window.

(3) Calculate $R_y = RES \cdot R_x \cdot RES^H + R_W = RES \cdot Rxy + R_W$. This matrix is of size P×P.

(4) Calculate $C = R_{xy} \cdot R_y^{-1}$. The size of this matrix is N·M×P (5) Calculate the estimated pilot signal vector as C·Y, and reshape the vector into a matrix of size N·M to form the estimated pilot samples matrix $\hat{X}$ of size N×M on the Time-Frequency lattice A.

(6) Calculate the channel estimate $Ch = \overline{X} \cdot \hat{X}$ where $\overline{X}$ represents taking the conjugate of each element of X, and .· represents element by element multiplication. The size of this matrix is N×M (7) Pick the portion of Ch that represents the Time-Frequency portion for which the channel acquisition is required.

A more optimal way of getting the same result is to calculate the minimum size matrices in every step required to get to the required portion of Ch. The following is an example of such simplification:

(1) Calculate $R_{xy}$ directly only calculating the elements of the restricted $R_x$ only for the portion of the channel that needs to be acquired. E.g. if only L<N time samples of the channel are needed (for either interpolation or prediction beyond the last pilot sample), then the size of this matrix will be L·M×P.

(2) Calculate $R_y$ directly only calculating the elements of the doubly restricted $R_x$.

(3) Calculate $C = R_{xy} \cdot R_y^{-1}$. The size of this matrix will now be L·M×P (4) Calculate the estimated pilot signal vector as C·Y, and reshape the vector into a matrix of size L·M to form the estimated pilot samples matrix $\hat{X}$ of size L×M on the Time-Frequency lattice A.

(5) Calculate the channel estimate $Ch = \overline{X} \cdot \hat{X}$ where $\overline{X}$ represents taking the conjugate of each element of X, and .· represents element by element multiplication. The size of this matrix is L·M, and it represents the Time-Frequency portion for which the channel acquisition is performed.

4. Hybrid Delay Time Domain Channel Acquisition

Figure 5:
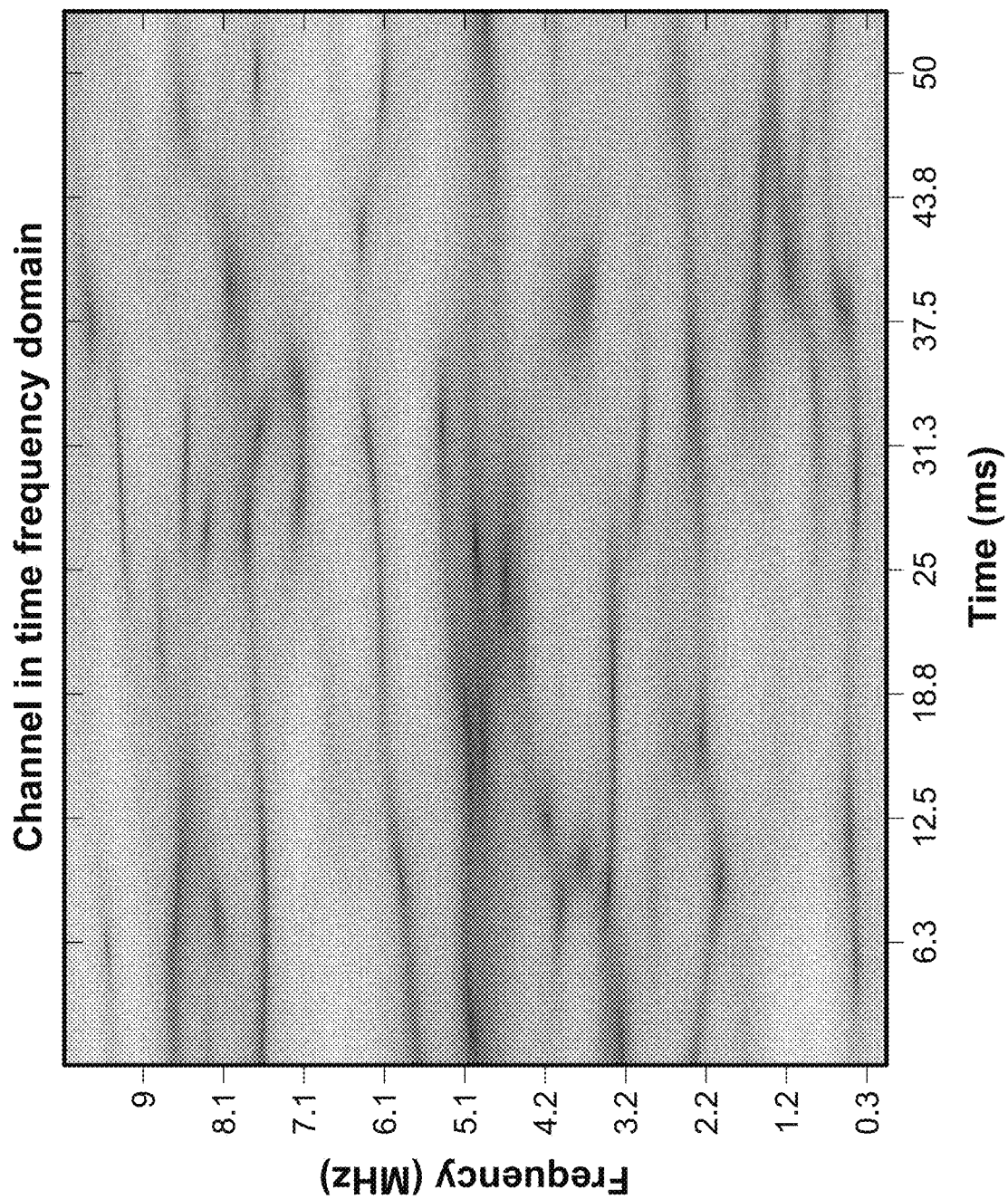
FIG. 5 is a graph showing an example of a channel in time-frequency domain.
Figure 6:
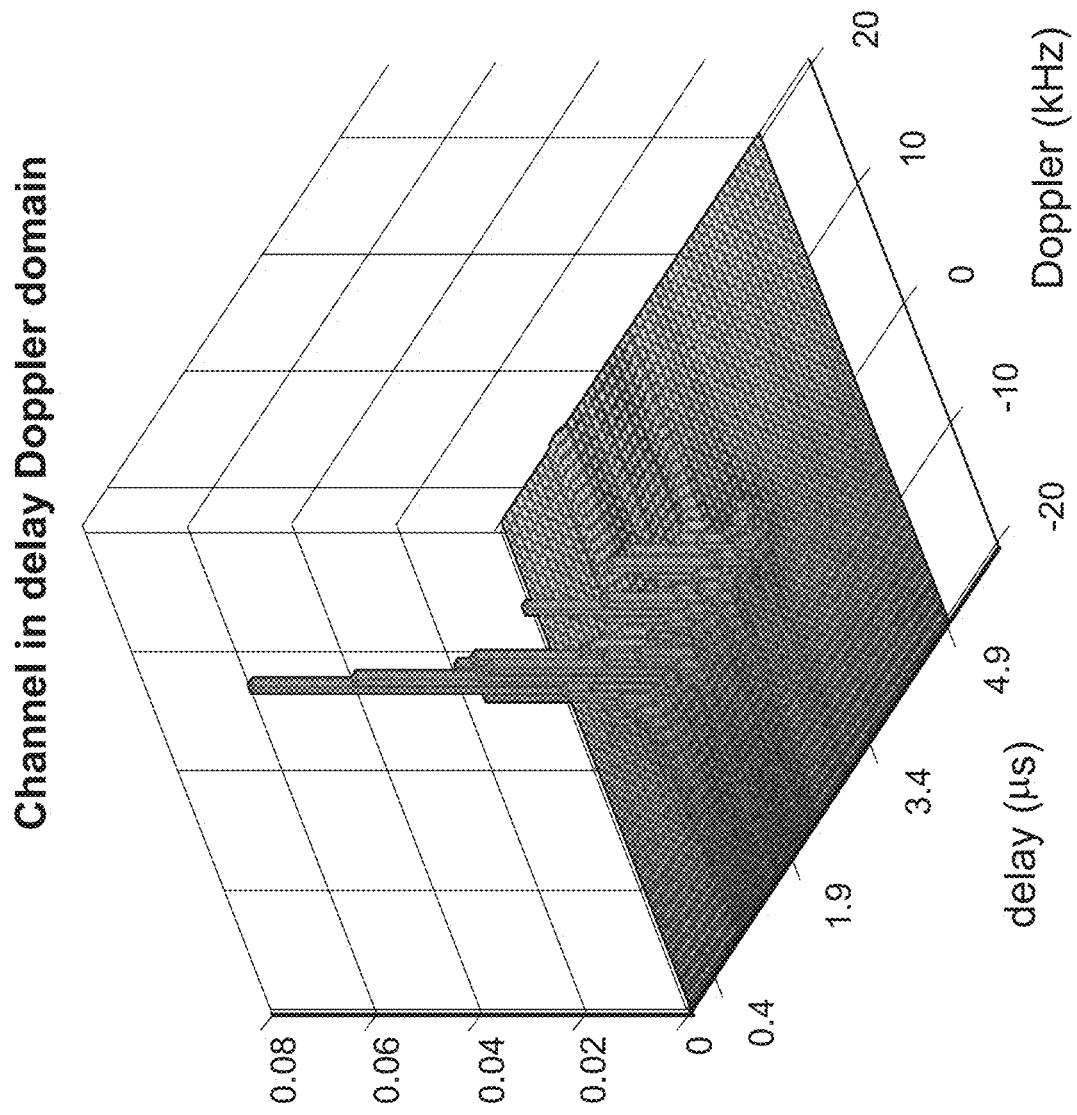
FIG. 6 is a graph showing an example of a channel in delay-Doppler domain.
Figure 7:
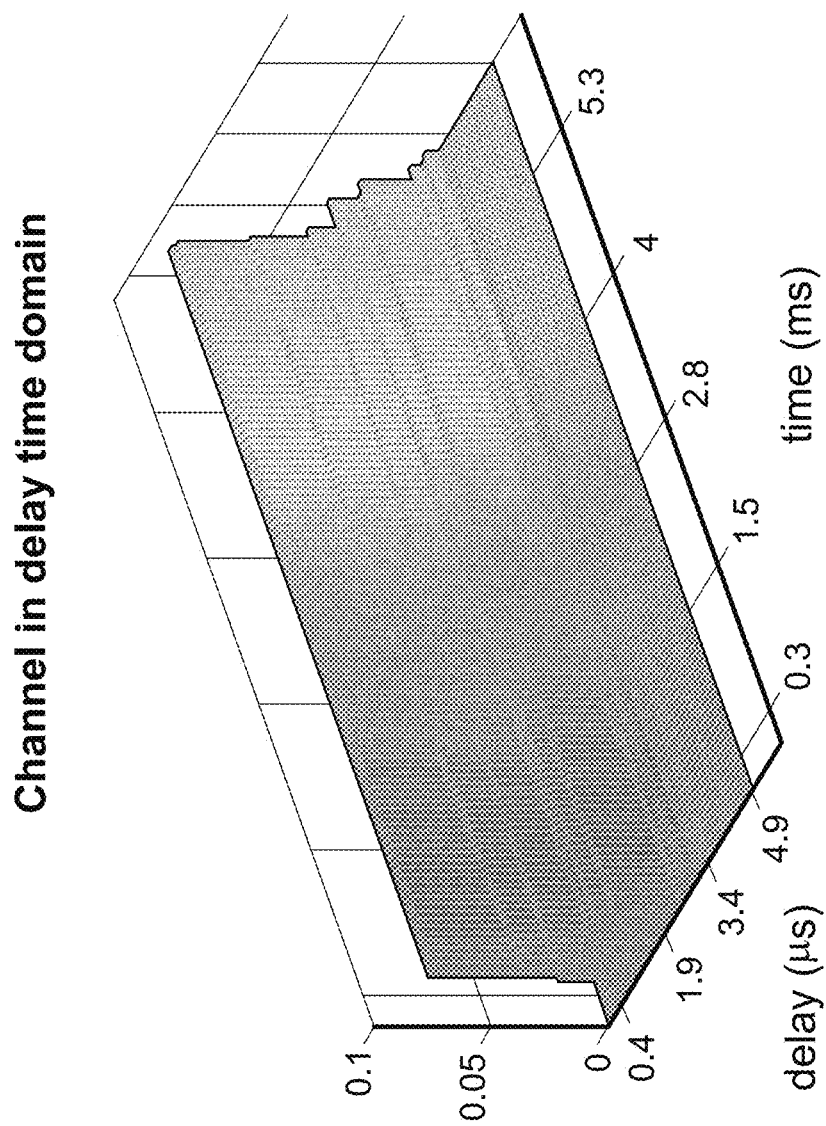
FIG. 7 is a graph showing an example of a channel in delay-time domain.

The channel acquisition methods described in this section utilize the hybrid delay time domain. In this domain, channels are local convolution along delay (which makes separating the pilots easy) and non-local multiplicative along time (which makes interpolating and predicting easy). FIG. 5, FIG. 6 and FIG. 7 show examples of this process.

4.1 Pilot Separation in the Delay Time Domain

Assume that 4 pilots are transmitted by 4 hub antenna ports, and that the pilots are

Figure 8:
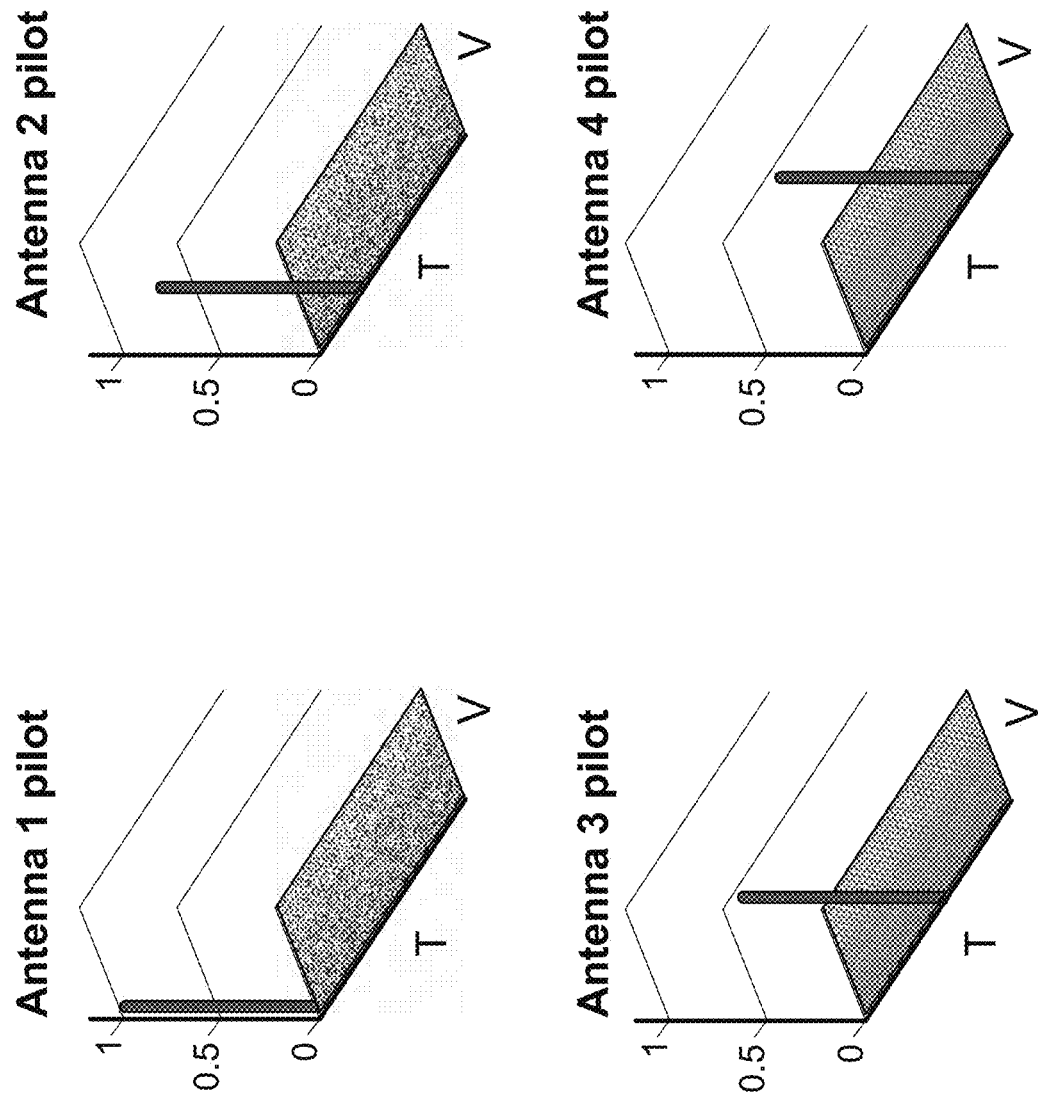
FIG. 8 shows examples of chirp sequences on the Delay-Doppler plane. The span of the plane is 1/df in the delay dimension and 1/(Ndt) in the Doppler dimension.

*Diracs* located on the Delay-Doppler plane at: $(\tau, \nu) = (0, 0)$, $$\left(\frac{1}{4df}, 0\right), \left(\frac{2}{4df}, 0\right), \left(\frac{3}{4df}, 0\right)$$

as shown in FIG. 8.

On the Time-Frequency pilot sub-lattice, each receive antenna may receive a linear combination of each pilot distorted by its own channel. To separate the pilots, the received signal may be converted from the Time-Frequency domain to the delay time domain. This may be accomplished via a one dimensional Fourier transform across the frequency dimension. Knowing that channels act by convolution in the delay domain, embodiments can compute what the remote antennas will observe. Let the map $$s_i: \mathbb{C}(\Lambda_{(f,t)}^{Down}) \to \mathbb{C}$$

denote the signal received by the i'th remote antenna on downlink sub-lattice. Then in delay time domain, the following equality can be written:

$$s_i(\tau, kNdt + dt) = \sum_{j=1}^{4} h_{i,j}\left(\tau - \frac{j-1}{4df}, kNdt + dt\right),$$

for all $k \in \mathbb{Z}$ and $$\tau \in \left[0, \frac{1}{df}\right].$$

Where $h_{ij}$ denotes the channel between the j'th hub antenna and the i'th remote antenna in the delay time domain.

Figure 9:
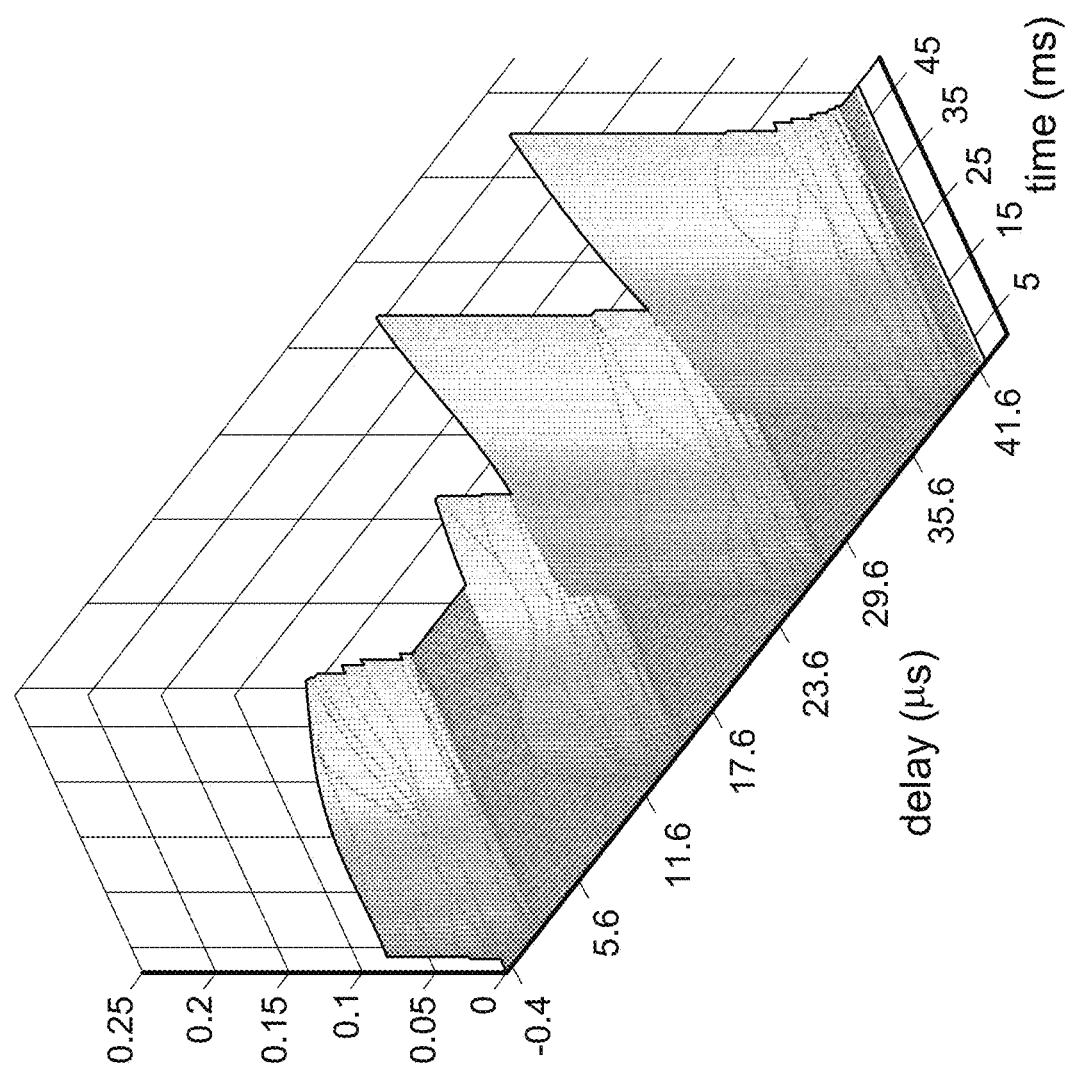
FIG. 9 is a graph showing an example of a signal received by a single remote antenna in the delay time domain.

FIG. 9 shows the 4 pilots of FIG. 8 after going through their separate channels as observed by the receiver in the delay time domain.

Using the above equation, the different pilot (i.e. channel) responses can be isolated via windowing. Namely, to isolate $h_{ij}$ some embodiments may apply the following square mask to $s_i$ in the delay time domain:

$$M_{i,j}(\tau, kNdt) = \begin{cases} 1 & \text{if } \left|\tau - \frac{j-1}{4df}\right| \leq \Delta\tau \\ 0 & \text{else} \end{cases}$$

where $\Delta\tau$ denotes the delay spread of the channel.

4.2 Windowing

Windowing the measured channel in the Time-Frequency domain (e.g. using a squared cosine window) makes the channel responses typically better isolated in the delay domain, thus making pilot separation more effective.

Furthermore, $M_{ij}(\tau, kNdt)$ can get other values. When the observation window in the frequency dimension is very large $M_{ij}(\tau, kNdt)$ could be reduced to be close to ½ the delay spread. In other cases, e.g. when using a square window in the Time-Frequency domain, a larger value for $M_{ij}(\tau, kNdt)$ may result in a better performance.

4.3 Channel Interpolation and Prediction in the Delay Time Domain

In the previous section, it was described how the signal received by the receive antennas could be used to extract the channel between each pairing of transmit and receive antenna restricted to the pilot sub-lattice.

FIG. 10 is a graph showing an example interpolation problem. The graph on the left shows a channel response measured on the pilot sub-lattice. The graph on the right shows the desired channel response, where intermediate values of the channel response missing from the values measured from pilot signals have to be generated at a receiver.

Figure 11:
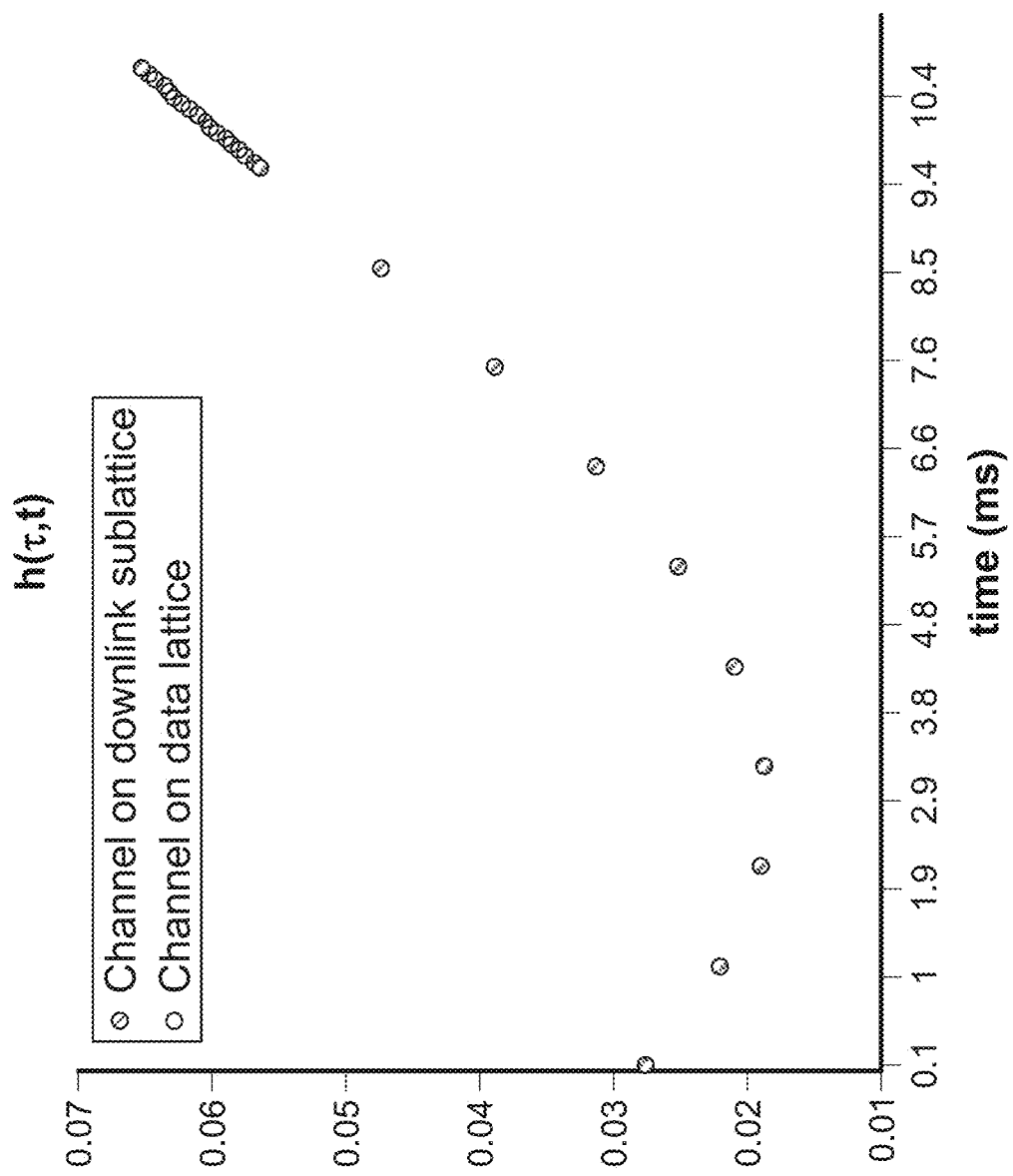
FIG. 11 is a graph showing an example of a one dimensional interpolation problem. For each delay value i use the value of the channel on the pilot sub-lattice to estimate the channel on the data lattice.

FIG. 11 is a graph showing an example of a one dimensional interpolation problem. For each delay value i, some embodiments may use the value of the channel on the pilot sub-lattice (including two or more pilot sub-lattice points) to estimate the channel on the data lattice.

Implementations should also address the problem of interpolation and prediction. That is, how can the channel be estimated for a past or future portion of the data lattice?

The solution some embodiments may use is to turn the problem into a collection of one-dimensional problems. Namely, for each delay value the channel may be interpolated or extrapolated across time.

The fact that the channel is band limited with respect to time means the problem is tractable. There are a wide variety of methods which can be used to perform the one dimensional interpolation or prediction, for example:

Spline: A piecewise polynomial is found which takes the value of the measured channel on the downlink sub-lattice. The values of the resulting function on the data lattice are used as an estimate for the channel.

MMSE: The channel is assumed to be a random band limited function. Based on this assumption and the measurements of the channel on the downlink sub-lattice, the most likely values of the channel on the data lattice are computed.

Fourier transform: A discrete Fourier transform (DFT) is taken of the channel measured on the downlink sub-lattice. All Fourier coefficients corresponding to frequencies greater than the channel bandwidth are set the zero. The Fourier coefficients are then zero padded and an inverse DFT is taken. The values of the resulting function on the data lattice are used as an estimate of the channel.

Figure 12:
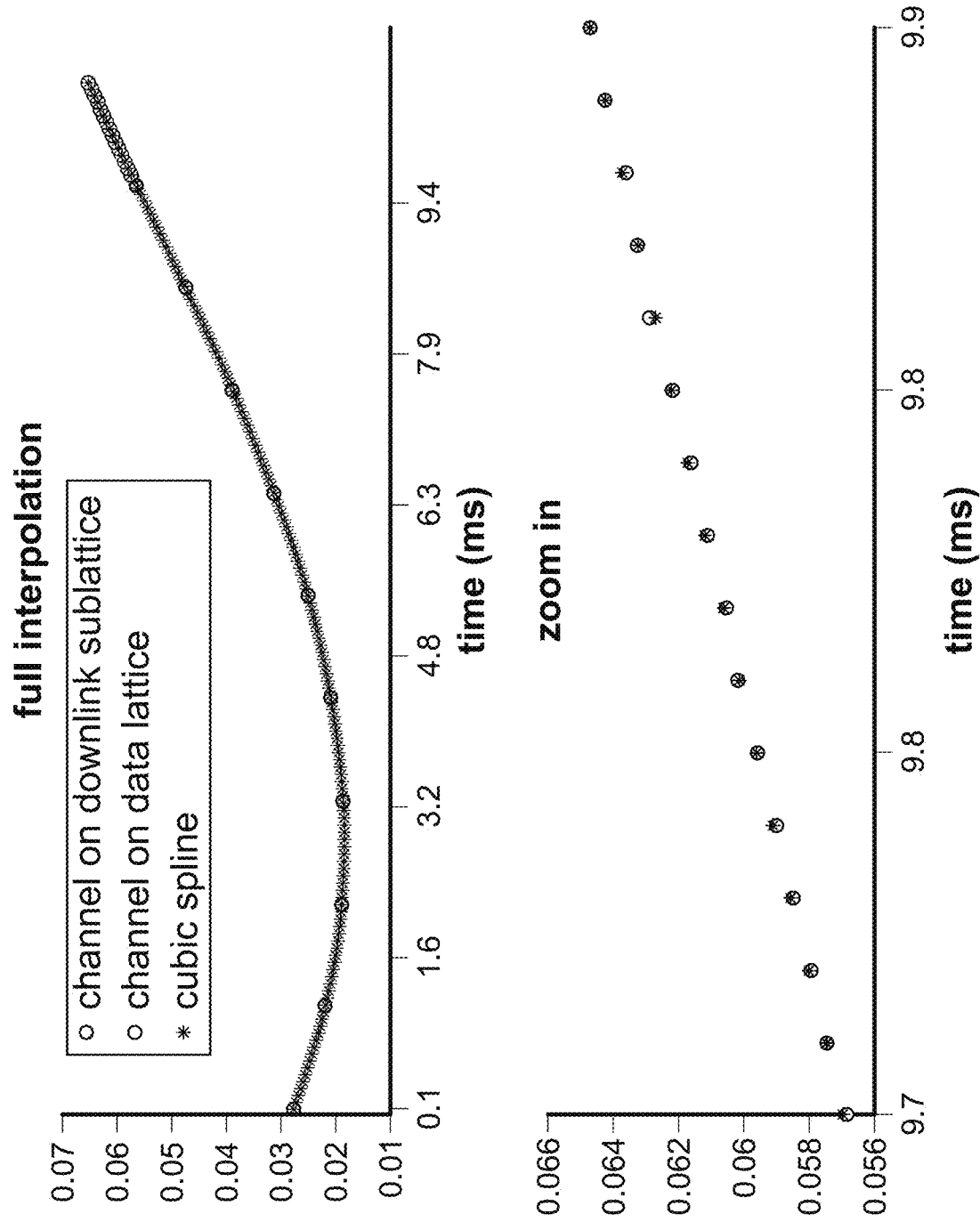
FIG. 12 is a graph showing an example of a result of cubic spline interpolation. Top: shows the full spline. Bottom.

All three methods can be efficiently implemented using linear algebra. FIG. 12 shows the result of applying the cubic spline interpolator to the channel displayed in FIG. 11.

Once the channels have been interpolated/extrapolated in the delay time domain taking the inverse Fourier transform across delay converts the channel into the Time-Frequency domain. In some embodiments, the receiving device may perform the following four steps for channel estimation:

Convert to the delay time domain by taking the Fourier transform of the signal measured on the downlink sub-lattice.

Separate the channel response between the different hub and remote antenna pairings by applying square masks.

Estimate the channel on a portion of the data lattice by interpolating or extrapolating the channel responses across time.

Convert the channel to the Time-Frequency domain by taking an inverse Fourier transform across delay.

Instead of applying the inverse Fourier transform described in step 4 on the full delay span of the Delay-Doppler plane, some embodiments could apply the inverse Fourier transform only on the masked portion, or just the portion of the delay span around the pilot that is associated with the pilot lattice, and then, in the Time-Frequency domain, applying again the Spline or MMSE methods described above.

5. Delay-Doppler Domain Channel Acquisition

The channel acquisition methods described in this section utilize the Delay-Doppler domain. In this domain channels are local convolution along both delay and Doppler. In this case received signal is converted from the Time-Frequency domain to the Delay-Doppler domain. This is accomplished via a two dimensional symplectic Fourier transform.

Similar to what is described in Section 4.1, the different pilot (i.e. channel) responses can be isolated via windowing.

In this case a two dimensional Delay-Doppler window is applied, so to isolate $h_{ij}$ that corresponds to the 4 pilots in Section 4.1 apply the following square mask to $s_i$ in the Delay-Doppler domain:

$$M_{ij}(\tau, \nu) = \begin{cases} 1 & \text{if } \left|\tau - \frac{j-1}{4df}\right| \leq \Delta\tau \text{ and } |\nu| \leq \Delta\nu \\ 0 & \text{else} \end{cases}$$

where $\Delta\tau$ and $\Delta\nu$ denote the delay and Doppler spreads of the channel.

In some embodiments, the measured channel may be windowed in the t-f domain. Windowing the measured channel in the Time-Frequency domain (e.g. using a squared cosine window) makes the channel responses better isolated in the Delay-Doppler domain, thus making pilot separation more effective.

$M_{ij}(\tau, \nu)$ can get other values. When the observation window in the frequency dimension is very large, the size of $M_{ij}(\tau, \nu)$ could be reduced to be close to ½ the delay spread. In other cases, e.g. when using a square window in the Time-Frequency domain, a larger size $M_{ij}(\tau, \nu)$ may result in a better performance.

In various embodiments, the pilots could be placed in both dimensions, e.g. 8 pilots could be Dirac delta functions located on the Delay-Doppler plane at:

$$(\tau, \nu) = (0, 0), \left(\frac{1}{4df}, 0\right), \left(\frac{2}{4df}, 0\right), \left(\frac{3}{4df}, 0\right), \left(0, \frac{1}{2dt}\right),$$

$$\left(\frac{1}{4df}, \frac{1}{2dt}\right), \left(\frac{2}{4df}, \frac{1}{2dt}\right), \left(\frac{3}{4df}, \frac{1}{2dt}\right).$$

In this case there would be a need to also separate the pilots in the Doppler dimension where this windowing could be applied for the purpose of pilot separation.

After applying the window, the channel can be estimated by either applying the 2-D Symplectic DFT of the masked Delay-Doppler plane, or alternatively applying the 2-D Symplectic DFT on a portion of the plane and then applying a 2 dimensional Spline or MMSE in the time-frequency plane to estimate the channel on the desired portion of the Time-Frequency plane.

6. OTFS Based Reference Signal Introduction

Sections 7-9 below provide a description for embodiments for pilot signal generation, transmission and reception in wireless networks.

7. OTFS Based Reference Signals 7.1 Brief Summary

In general, OTFS based reference signals may be sent separately from the data. The idea is that the reference signals can be sent on a time-frequency lattice which is coarser than the data lattice.

Assume the time-frequency (t-f) lattice of the data is defined by the following discrete points:

$$\Lambda_{t,f}^P = \mathbb{Z}dt \oplus \mathbb{Z}df = \{(Kdt, Ldf): K, L \in \mathbb{Z}\} \qquad (1)$$

The t-f lattice for the reference signals (pilots) will be a subset of the data lattice:

$$\Lambda_{t,f}^P = \mathbb{Z}Ndt \oplus \mathbb{Z}Mdf \ N, M \geq 1 \qquad (2)$$

The Delay-Doppler (τ, ν) tori associated with the two lattices are:

Data torus with circumferences
$C_\tau^D = 1/df$
$C_\nu^D = 1/dt$

Pilot torus with circumferences
$C_\tau^P = 1/(Mdf)$
$C_\nu^P = 1/(Ndt)$

FIG. 13 shows an example of a torus.

It can be shown that a function X[K,L] on the t-f lattice defined in (1) can be transformed to a 2-D (continuous periodic) function on the associated torus using a symplectic discrete Fourier transform defined as $$x(\tau, \nu) = SDFT(X[K, L]) \triangleq \sum_{K,L} X[K, L] e^{-j2\pi(\nu K dt - \tau L df)} \quad (3)$$

The inverse transform of $x(\tau, \nu)$ to X [K, L] is an inverse symplectic Fourier transform defined as:

$$X[K, L] = SDFT^{-1}(x(\tau, \nu)) \triangleq \frac{1}{dtdf} \int_0^{\frac{1}{df}} \int_0^{\frac{1}{dt}} x(\tau, \nu) e^{j2\pi(\nu K dt - \tau L df)} d\nu d\tau \quad (4)$$

Limiting the data and pilot lattices to the 2-D discrete intervals k×l and n×m respectively:

$(\Lambda_{t,f}^D)_{k,l} = [0:k-1]dt \oplus [0:l-1]df$ $(\Lambda_{t,f}^P)_{n,m} = [0:n-1]Ndt \oplus [0:m-1]Mdf$ translates to uniformly sampling the respective tori to k×l and n×m samples. These sampled tori create lattices that are reciprocal to their associated lattices in the t-f plane and are defined as follows:

$$\Lambda_{\tau,\nu}^D = (\Lambda_{t,f}^D)^\perp = \mathbb{Z}/df \oplus \mathbb{Z}/dt = \left\{\left(K\frac{1}{df}, L\frac{1}{dt}\right); K, L \in \mathbb{Z}\right\} \quad (5)$$

$$\Lambda_{\tau,\nu}^P = (\Lambda_{t,f}^P)^\perp = \mathbb{Z}/Ndf \oplus \mathbb{Z}/MdtN, M \geq 1 \quad (6)$$

When choosing k=N−1, M=1, and l=m, the t-f plane will look as shown in FIG. 14, where the horizontal axis corresponds to time and the vertical axis corresponds to frequency. The filled in points correspond to pilots and the hollow circles correspond to data.

A reference signal can be viewed as a symplectic exponential restricted to a subset of points in the data lattice. If this subset is regular (i.e. forms a sub-lattice) the reference signal is considered structured, otherwise it is considered non-structured.

7.2 2-D Structured Reference Signals

2-D structured reference signals are pilots that are generated on the Delay-Doppler plane which is associated with a sub-lattice of the data lattice (N>1, M≥1). These pilots are multiplexed in the t-f domain with the data.

There are multiple approaches that could be used to efficiently generate 2-D structured OTFS based reference signals for a given Delay-Doppler spread and allowed channel overhead. The following subsections describe three approaches.

Some embodiments could choose to implement a relaxed version of any of these approaches and/or combinations of the approaches depending on usage scenarios and/or limitations such as backward compatibility, simplicity of implementation, etc.

7.2.1 Delay-Doppler Packing Reference Signals

The Delay-Doppler Packing reference signals may be generated as follows:

(1) Choose the finest t-f pilot lattice (smallest N and M) that meets the allowed overhead (2) Include, in the continuous Delay-Doppler torus associated with the selected pilot lattice, as many pilots as possible (spaced as sparsely as possible) while considering the ability of receivers to achieve good enough pilot separation and channels estimation for the expected delay and Doppler spreads of the channels.

(3) Transform the Delay-Doppler plane to the t-f plane (e.g., symplectic Fourier transform).

(4) Apply the n×m window to create the n×m discrete intervals.

Some of the parameters that may have an impact on how many pilots can be supported by a given pilot torus are: the size of the pilot observation window (selection of n and m), the delay and Doppler spreads of the channel, and the receiver implementation (e.g. t-f window size and shape, interpolation and pilot separation algorithms). A large enough t-f window (large n and m) will allow optimal packing of up to $N_{DD}^P$ pilots:

$N_{DD}^P = \lfloor C_\tau^P/\Delta_\tau \rfloor \cdot \lfloor C_\nu^P/\Delta_\nu \rfloor$ where [x] is the largest integer smaller than x, $\Delta_\tau$ is the delay spread of the channel, and $\Delta_\nu$ is the Doppler spread of the channel.

FIG. 15 shows an example of packing of 8 reference signals in the Delay-Doppler plane (the τ axis represents time and the ν axis represents Doppler).

7.2.1.1 Example

The following example shows how implementations can use the Delay-Doppler Packing to generate a large number of reference signals with low overhead in an enumeration similar to the LTE enumeration.

Assume the following:
Channel:
Bandwidth: 10 Mhz
Delay spread: $\Delta_\tau$=5 us
Doppler spread: $\Delta_\nu$=300 Hz ptp (150 Hz peak)
Data Lattice (see Eq. (1)):
dt=66.67 us
df=15 Khz
Allowed overhead: <7%
Delay-Doppler Packing solution:

To meet the allowed overhead requirement, one solution can be to assign every 15th lattice point in the time domain and all the lattice points in the frequency domain to the reference signals, resulting in the following Delay-Doppler Packing:

Pilot Lattice (see Eq. (2)):
N=15
M=1
Associated Pilot torus:
Delay circumference: $C_\tau^P = 1/(Mdf) = 66.67$ us
Doppler circumference: $C_\nu^P = 1/(Ndt) = 1000$ Hz An optimal packing with a large t-f window will support up to the following number of pilots:

$N_{DD}^P = \lfloor C_\tau^P/\Delta_\tau \rfloor \cdot \lfloor C_\nu^P/\Delta_\nu \rfloor = \lfloor 66.67/5 \rfloor \cdot \lfloor 1000/300 \rfloor = 13 \cdot 3 = 39$ For the purpose of this example, assume the implementation uses a Raised Cosine (RC) filter in both the transmitter and the receiver with the following Tx/Rx windows:

Number of time samples: 50 (n=36, and additional 14 for the RC filter)

Number of frequency samples: 626 (m=500, and additional 126 for the RC filter)

Pilot packing: For this example, we limit the number of pilots to 20 and stack them as follows:

Number of pilots in delay domain: 10

Number of pilots in Doppler domain: 2

The pilots will also be positioned with an offset of 4 lattice points in the delay dimension and in the middle of their allocated Doppler interval. This translates to the lattice point (5,9) for the first pilot.

FIG. 16 shows the 20 pilots in the Delay Doppler plane.

FIG. 17 zooms in to show the pilots in the first 100 lattice points in the delay dimension.

To show the worst case impact of the windows on the channel time-delay spread the graph in FIG. 18 shows the received pilots when the channel is represented by the following two paths (no direct path):

Path 1: Delay=5 us, Doppler shift=152.8 Hz

Path 2: Delay=0.067 us, Doppler shift=−152.8 Hz

These two paths result in the received pilots being positioned exactly in the middle between lattice points causing the worst leakage of the receive window to neighboring lattice points, which represents the worst case for pilot separation.

The received pilots in the Delay-Doppler plane (zoomed in to show only the pilots in the first 100 lattice points in the delay dimension) are shown in FIG. 18.

FIG. 19 shows the lattice points in the Delay-Doppler plane where the received signal is above −40 dB from the highest level of the received pilot. As can be seen from FIG. 19, the received pilots' leakage to the surrounding pilots is lower than 40 dB below the pilot itself. Other receiver implementations may result in even lower leakage which will allow packing more pilots.

7.2.2 Time-Frequency Packing Reference Signals

The Time-Frequency Packing reference signals are generated as follows:

Choose the coarsest t-f pilot lattice (largest N and M) that can support a single channel estimation (one pilot)

Stager as many of these pilot lattices as possible ($N_{\tau F}^G$) at equal distances between lattice points without violating the allowed overhead Put a single pilot in the Delay-Doppler torus associated with the selected t-f pilot lattice.

Transform the Delay-Doppler plane to the t-f plane (symplectic Fourier transform)

Create $N_{\tau F}^G$ copies of the t-f plane and stagger them as stated in step [0162].

Apply the n×m window to each of the t-f planes (may be a different window to each plane).

The size of the pilot window will have an impact on the quality of the channel estimation (a larger lattice will improve the quality of the channel estimation)

FIG. 20 shows an example of a Time-Frequency packing of two reference signals, indicated by filled in row of lattice points 2002 and 2004, respectively).

7.2.3 Latency Sensitive Packing Reference Signals

The Latency Sensitive Packing reference signals may be generated as follows:

(1) Choose the finest t-f pilot lattice (smallest N and M) that meets the allowed overhead (2) Choose the smallest size pilot observation window in the time domain (smallest n) that supports one pilot in the Doppler torus (in the Delay Doppler plane).

(3) Include, in the Delay-Doppler torus, as many pilots as possible (spaced as sparsely as possible) while considering the ability of receivers to achieve good enough pilot separation and channels estimation for the expected delay and Doppler spreads of the channels.

(4) Transform the Delay-Doppler plane to the t-f plane (symplectic Fourier transform)

(5) Apply the n×m window to the t-f plane

7.2.3.1 Example

Adopting the same assumptions as in the previous example, embodiments can shorten the time interval of the window to pack only one pilot in the Doppler dimension. Assuming RC filters again, the solution may be as follows:

Number of time samples: 15 (n=9, and additional 6 for the RC filter)

Number of frequency samples: 626 (m=500, and additional 126 for the RC filter)

Pilot packing: For this example, we limit the number of pilots to 10 and stack them only in the delay domain.

The pilots will be position with an offset of 4 lattice points in the delay dimension and in the middle of the Doppler interval. This translates to the lattice point (5,5) for the first pilot.

To show the worst case impact of the windows on the channel time-delay spread we show the received pilots when the channel is represented by the following two paths (no direct path):

Path 1: Delay=5 us, Doppler shift=166.7 Hz

Path 2: Delay=0.067 us, Doppler shift=−166.7 Hz

These two paths result in the received pilots being positioned exactly in the middle between lattice points causing the worst leakage of the receive window to neighboring lattice points, which represents the worst case for pilot separation.

The received pilots in the Delay-Doppler plane (zoomed in to show only the pilots in the first 100 lattice points in the delay dimension) are shown in FIG. 21.

FIG. 22 shows the lattice points in the Delay-Doppler plane where the received signal is above −40 dB from the highest level of the received pilot.

7.3 2 Non-Structured Reference Signals

Non-structured reference signals RE pilots that are generated on a Delay-Doppler torus with the same circumference as the data torus, transformed to the t-f plane and then restricted to a limited number of lattice points on the t-f lattice. The number of lattice points assigned to the reference signals, and their locations, will dictate how many pilots can be supported by that assignment.

8. Examples of OTFS based Downlink Reference Signals

8.1 Cell-Specific Reference Signals

Cell-specific reference signals are transmitted in all downlink (DL) sub-frames and are available to all UEs in the cell.

8.1.1 FDD

In FDD, since the DL transmissions are regular, some embodiments may use the Delay-Doppler packing with the minimal overhead which allows packing a number of pilots equal to the number of antenna ports used by the transmitting device such as the eNodeB. Some embodiments may transmit the pilots continuously (infinite lattice in the time domain). Each pilot will be transformed from the Delay-Doppler plane to the t-f plane separately and sent to its antenna port (see FIG. 23). The receiver may apply the appropriate window to get separation between the different pilots and good enough interpolation from the pilot lattice to the data lattice in the t-f plane. Transmitting the pilots continuously should not impact the data latency as the receiver can implement a sliding t-f window starting from the time it powers up, collect pilot information continuously, and be ready to estimate the channel when it needs to receive control information or data. The number of transmitted pilots and their location in the Delay-Doppler plane needs to be known to the UEs. The size and shape of the t-f window at the receiver is implementation specific and need not be specified.

8.1.2 TDD

In TDD, the regularity of the DL transmissions depends on the frame size. In LTE the shortest periodicity of DL transmissions is 5 ms (half the frame size) which, if used as the lattice points of the time domain in the t-f plane, results in a Doppler circumference of the pilot torus of 200 Hz (⅕ ms). This translates to the ability to estimate channels with a Doppler spread of no more than 200 Hz. If shorter DL periodicity is supported, larger Doppler spreads (or more pilots) can be supported using the 2-D structured reference signals.

If the regularity of the DL transmission is not fine enough to support the delay spread of the channel, one (or both) of the following other options can be used:

(1) Use reference signals if the assignment of lattice points for the reference signals supports a structure in a dimension higher than 2-D.

(2) Use 2-D non structured reference signals and restrict them to all the t-f lattice points that are available for reference signals.

8.2 UE-Specific Reference Signals

UE-specific reference signals may only sent to specific UEs when the eNodeB transmits data to the UEs. These reference signals may be transmitted when the eNodeB uses an antenna port which is different than the cell-specific antenna ports (e.g. when the eNodeB uses a UE specific beam forming when sending data to the UE). In this case the reference signal can only be sent within the frequency band and time assigned to the UE specific transmission.

Any of the reference signals described in Section 7 can be used for the UE-specific reference signals. The type selected will depend on which t-f lattice points are available for the reference signals, as well as the frequency width and length of the transmission. As an example, a wider bandwidth transmission will enable sending multiple pilots which can be used to support multiple beams to the same UE.

The 2-D non structured reference signals could be used to send one or more pilots on the currently defined LTE UE-specific RS arrangements for any number of antenna ports.

9. Examples of OTFS Based Uplink Reference Signals 9.1 Demodulation Reference Signals Any of the reference signals described in Section 7 can be used for the demodulation reference signals. The type selected will depend on which t-f lattice points are available for the reference signals, as well as the frequency width and length of the transmission. As an example, a wider bandwidth transmission will enable sending multiple pilots which can be used to support multiple beams.

2-D non structured reference signals could be used to send one or more pilots on the currently defined LTE demodulation RS arrangement.

9.2 Sounding Reference Signals

Sounding reference signals can be regular and hence it is proposed to use the Delay-Doppler Packing approach to maximize the number of UEs simultaneously sending pilots for a given delay spread. To minimize the length of time for estimating the channel, one could choose Latency-Sensitive Packing using the maximum size lattice interval in the frequency dimension.

FIG. 24 is a flowchart for an example method 200 of wireless communication. The method 200 may be implemented by a wireless receiver, e.g., receiver 102 depicted in FIG. 1.

The method 200 includes, at 202, receiving a wireless signal comprising a data signal portion and a pilot signal portion wherein the pilot signal portion includes multiple pilot signals multiplexed together in an orthogonal time frequency space (OTFS) domain. The data portion may include information bits, e.g., user data and/or control data.

The method 200 includes, at 204, performing two-dimensional channel estimation in a time-frequency domain based on a minimum mean square error (MMSE) optimization criterion. In some embodiments, e.g., as described in section 3, the two-dimensional channel estimation may be performed by identifying a subset of the pilot signal portion from which to obtain a preliminary channel estimate in the time-frequency domain, estimating, using samples of the wireless signal received within a two-dimensional observation window, the preliminary channel estimate, and obtaining the channel estimate by interpolating and/or predicting the preliminary channel estimate.

As further explained in Sections 3 to 6, the channel estimation may be performed using all time domain signal samples or alternatively may be performed at only a subset, e.g., at which pilot signals are received, to obtain the preliminary channel estimate, and may be followed up by channel interpolation and/or channel prediction, using the estimates from the preliminary channel estimate, to acquire entirety of a channel.

In some embodiments, an FIR Wiener filter may be used for channel estimation based on received pilot signals.

The method 200 includes, at 206, recovering information bits using a channel estimate obtained from the two-dimensional channel estimation.

FIG. 25 is a flowchart for an example method 300 of wireless communication. The method 300 may be implemented by a wireless receiver, e.g., receiver 102 depicted in FIG. 1.

The method 300 includes, at 302, receiving, over a communication channel. a wireless signal comprising a data signal portion and a pilot signal portion wherein the pilot signal portion includes multiple pilot signals multiplexed together in an orthogonal time frequency space (OTFS) domain.

The method 300 includes, at 304, transforming the received wireless signal into a delay-time domain signal. In some embodiments, the transforming is performed using Fourier transform.

The method 300 includes, at 306, applying a delay-time domain mask to separate out each of the multiple pilot signal's contribution to the delay-time domain signal into corresponding separate received pilot signal contributions. In some embodiments, a square mask that includes the value "1" for delay and time values less than their respective thresholds, and zero otherwise, may be used. Alternatively, a smoother window function may be used for the mask.

The method 300 includes, at 308, estimating, using the separate received pilot signal contributions, the communication channel estimates at delay-time domain positions of the multiple pilot signals. The estimation may be performed using one of a number of different techniques such as piecewise polynomial approximation, MMSE or frequency-limited matching approximation.

The method 300 includes, at 310, interpolating the communication channel estimates to obtain an entire communication channel estimate. The interpolation may be performed across time domain for multiple values of delays using the preliminary channel estimates obtained using a technique described herein.

FIG. 26 is a flowchart for an example method 400 of wireless communication. The method 300 may be implemented by a wireless receiver, e.g., receiver 102 depicted in FIG. 1.

The method 400 includes, at 402, receiving, over a communication channel. a wireless signal comprising a data signal portion and a pilot signal portion wherein the pilot signal portion includes multiple pilot signals multiplexed together in an orthogonal time frequency space (OTFS) domain.

The method 400 includes, at 404, transforming the received wireless signal into a delay-Doppler domain signal by applying a two-dimensional symplectic Fourier transform.

The method 400 includes, at 406, applying a delay-Doppler domain mask to separate out each of the multiple pilot signal's contribution to the time-frequency domain signal into corresponding separate received pilot signal contributions.

The method 400 includes, at 408, estimating, using the separate received pilot signal contributions, the communication channel estimates at delay-Doppler domain positions of the multiple pilot signals.

The method 400 includes, at 410, interpolating the communication channel estimates to obtain an entire communication channel estimate.

In some embodiments, a wireless communication apparatus may include a memory and a processor, wherein the memory stores instructions which, when implemented, cause the processor to implement the method 200, 300 or 400.

Additional details of method 200, 300 and 400 are also described in Section 3, 4 and 5, respectively (e.g., time-frequency domain channel acquisition, or hybrid delay-time domain channel acquisition, or delay-Doppler domain channel acquisition).

FIG. 27 shows an example of a wireless transceiver apparatus 500. The apparatus 500 may be used to implement method 200, 300 or 400. The apparatus 500 includes a processor 502, a memory 504 that stores processor-executable instructions and data during computations performed by the processor. The apparatus 500 includes reception and/or transmission circuitry 506, e.g., including radio frequency operations for receiving or transmitting signals.

It will be appreciated that techniques for wireless data reception are disclosed by performing channel acquisition based on OTFS pilot signals.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination.

Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A wireless communication method for recovering information bits from a received signal, implemented by a wireless communication receiver, comprising:
   receiving a wireless signal comprising a data signal portion and a pilot signal portion wherein the pilot signal portion includes multiple pilot signals multiplexed together in an orthogonal time frequency space (OTFS) domain;
   performing two-dimensional channel estimation in a delay-Doppler domain based on an optimization criterion; and
   recovering information bits using a channel estimate obtained from the two-dimensional channel estimation.

2. The method of claim 1, wherein the performing the two-dimensional channel estimation includes:
   identifying a subset of the pilot signal portion from which to obtain a preliminary channel estimate in the delay-Doppler domain;
   estimating, using samples of the wireless signal received within a two-dimensional observation window, the preliminary channel estimate; and
   obtaining the channel estimate by interpolating and/or predicting the preliminary channel estimate.

3. The method of claim 2, wherein the preliminary channel estimate is estimated using all samples of the wireless signal.

4. The method of claim 2, wherein the preliminary channel estimate is estimated using a subset of samples corresponding to less than all the samples of the wireless signal, depending on the preliminary channel estimate.

5. The method of claim 2, wherein estimating operation includes calculating a finite impulse response (FIR) Wiener filter estimate using the subset of the pilot signal portion.

6. The method of claim 1, wherein the optimization criterion comprises a minimum mean square error (MMSE) optimization criterion.

7. The method of claim 1, wherein the optimization criterion is based on a two-dimensional spline function.

8. A wireless communication apparatus comprising a processor, wherein the processor is configured to implement a wireless communication reception method, the method comprising:
   receiving a wireless signal comprising a data signal portion and a pilot signal portion, wherein the pilot signal portion includes multiple pilot signals multiplexed together in an orthogonal time frequency space (OTFS) domain;
   performing two-dimensional channel estimation in a delay-Doppler domain based on an optimization criterion; and
   performing information bit recovery using a channel estimate obtained from the two-dimensional channel estimation.

9. The apparatus of claim 8, wherein the processor is configured, as part of the estimating the two-dimensional channel estimation, to:
   identify a subset of the pilot signal portion from which to obtain a preliminary channel estimate in the delay-Doppler domain;
   estimate, using samples of the wireless signal received within a two-dimensional observation window, the preliminary channel estimate; and
   obtain the channel estimate by interpolating and/or predicting the preliminary channel estimate.

10. The apparatus of claim 9, wherein the processor is configured, as part of the estimating the preliminary channel estimate, to:
    estimate the preliminary channel using all the samples of the wireless signal.

11. The apparatus of claim 9, wherein the preliminary channel estimate is estimated using a subset of samples corresponding to less than all the samples of the wireless signal, depending on the preliminary channel estimate.

12. The apparatus of claim 9, wherein estimating operation includes calculating a finite impulse response (FIR) Wiener filter estimate using the subset of the pilot signal portion.

13. The apparatus of claim 8, wherein the optimization criterion comprises a minimum mean square error (MMSE) optimization criterion.

14. The apparatus of claim 8, wherein the optimization criterion is based on a two-dimensional spline function.

15. A wireless communication method for recovering information bits from a received signal, implemented by a wireless communication receiver, comprising:
    receiving a wireless signal comprising a data signal portion and a pilot signal portion wherein the pilot signal portion includes multiple pilot signals multiplexed together in an orthogonal time frequency space (OTFS) domain;
    performing two-dimensional channel estimation in a time-delay domain based on an optimization criterion; and
    recovering information bits using a channel estimate obtained from the two-dimensional channel estimation.

16. The method of claim 15, wherein the performing the two-dimensional channel estimation includes:
    identifying a subset of the pilot signal portion from which to obtain a preliminary channel estimate in the time-delay domain;
    estimating, using samples of the wireless signal received within a two-dimensional observation window, the preliminary channel estimate; and
    obtaining the channel estimate by interpolating and/or predicting the preliminary channel estimate.

17. The method of claim 16, wherein the preliminary channel estimate is estimated using all the samples of the wireless signal.

18. The method of claim 16, wherein the preliminary channel estimate is estimated using a subset of samples corresponding to less than all the samples of the wireless signal, depending on the preliminary channel estimate.

19. The method of claim 16, wherein estimating operation includes calculating a finite impulse response (FIR) Wiener filter estimate using the subset of the pilot signal portion.

20. The method of claim 15, wherein the optimization criterion comprises a minimum mean square error (MMSE) optimization criterion or a two-dimensional spline function.

\* \* \* \* \*